(12) United States Patent
Dong

(10) Patent No.: US 10,016,703 B2
(45) Date of Patent: Jul. 10, 2018

(54) PARALLEL FLOW CHANNEL TYPE FILTER CARTRIDGE

(71) Applicant: MICROFILTER CO., LTD., Chungcheongbuk-do (KR)

(72) Inventor: Joung Whi Dong, Seoul (KR)

(73) Assignees: MICROFILTER CO., LTD., Chungcheongbuk-do (KR); Joung Whi Dong, Seoul (KR)

( * ) Notice: Subject to any disclaimer, the term of this patent is extended or adjusted under 35 U.S.C. 154(b) by 116 days.

(21) Appl. No.: 15/139,877

(22) Filed: Apr. 27, 2016

(65) Prior Publication Data

US 2017/0028319 A1    Feb. 2, 2017

(30) Foreign Application Priority Data

Jul. 29, 2015  (KR) ........................ 10-2015-0107159

(51) Int. Cl.
| | |
|---|---|
| *B01D 27/14* | (2006.01) |
| *B01D 27/08* | (2006.01) |
| *C02F 1/00* | (2006.01) |

(52) U.S. Cl.
CPC ........... *B01D 27/142* (2013.01); *B01D 27/08* (2013.01); *C02F 1/001* (2013.01); *C02F 1/006* (2013.01); *B01D 2201/302* (2013.01); *B01D 2313/105* (2013.01); *B01D 2313/125* (2013.01); *C02F 2201/006* (2013.01); *C02F 2201/007* (2013.01)

(58) Field of Classification Search
None
See application file for complete search history.

(56) References Cited

U.S. PATENT DOCUMENTS 6,379,560 B1 *   4/2002  Tilp ..................... B01D 35/303
                                                   210/195.1
2012/0279916 A1 *  11/2012  Kirchner ............. B01D 35/153
                                                   210/232

FOREIGN PATENT DOCUMENTS

KR    10-1999-0021947    3/1999 ........... B01D 35/153

* cited by examiner

*Primary Examiner* — Benjamin M Kurtz
(74) *Attorney, Agent, or Firm* — Harness, Dickey & Pierce, P.L.C.

(57) ABSTRACT

A parallel flow channel type filter cartridge includes a filter portion which includes a plurality of filter bodies and a plurality of filter housings corresponding to the plurality of filter bodies and independently accommodating the respective filter bodies and a cartridge header in which a top is formed in a structure in which a tap water pipe surrounds a perimeter of a purified water pipe, a plurality of filter accommodating pipes coupled with top ends of the plurality of filter housings which form the filter portion to seal an inside of the filter portion are formed at a bottom, and a parallel structure type flow channel which allows tap water to flow into the plurality of filter accommodating pipes at the same time and then allows the water purified while passing through the plurality of filter bodies to be discharged through the purified water pipe is formed therein.

9 Claims, 21 Drawing Sheets

PARALLEL FLOW CHANNEL TYPE FILTER CARTRIDGE

CROSS-REFERENCE TO RELATED APPLICATION

This application claims the benefit of Korean Patent Application No. 2015-0107159, filed on Jul. 29, 2015 in the Korean Intellectual Property Office, the disclosure of which is incorporated herein by reference.

FIELD

The present disclosure relates to a parallel flow channel type filter cartridge, and more particularly, to a parallel flow channel type filter cartridge which includes a cartridge header with a parallel type flow channel capable of using a plurality of filter bodies at the same time to improve filterability and to easily maintain and repair a filter.

BACKGROUND

Generally, water purifiers include various filters such as a precipitation filter, a carbon filter, a membrane filter, etc. connected and installed thereinside according to use thereof to allow water to go through a physical or chemical process to be purified while passing through filters.

Filters described above have a structure in which an inlet into which water is injected and an outlet through which water is discharged are formed in a filter head and coupled with connection pipes to be connected with many water purifying filters to purify and supply water supplied form a water source to a water tank of a water purifier.

FIG. 1 is a configuration diagram of a conventional water purifier which includes a plurality of water purifying filters installed therein.

As shown in the drawing, in the conventional water purifier, filter cartridges such as a preprocessing precipitation filter 1, a pre carbon filter 2, a membrane filter 3, a post carbon filter 4, etc. are mounted to be used.

Here, the precipitation filter 1 provides a function of preliminarily filtering foreign substances such as sand, heavy metals, etc. included in water, the pre carbon filter 2 provides a function of adsorbing and removing a chlorine chemical, trihalomethane, organic chemicals, etc. which dissolve in the water, the membrane filter 3 is a core filter of the water purifier and provides a function of finally filtering foreign substances formed of heavy metals, viruses, bacteria, organic chemicals using a reverse osmosis concentration method using a high precision semipermeable membrane, and the post carbon filter 4 provides a function of filtering gas ingredients and odor ingredients which dissolve in the water.

Since the respective filters 1, 2, 3, and 4 which provide various functions described above have different exchange cycles while being used, it is generally necessary to separately replace a filter cartridge from a filter head.

However, when filter cartridges are separately replaced for each filter having a different exchange cycle, maintenance is difficult. When many filters are exchanged at the same time regardless of exchange cycles to solve this, maintenance costs are greatly increased.

In addition, since only one conventional filter cartridge can be mounted on a single filter head, there is a limitation in increasing a purified water amount. Also, since various components for being coupled with the filter head are necessary in addition to a filter body of the filter cartridge, resources are wastefully used.

Accordingly, a technology related to a practical and applicable filter cartridge capable of preventing an unnecessarily wasteful use of resources, reducing maintenance costs, being easily maintained and repaired, and increasing a purified water amount is acutely needed.

PATENT DOCUMENT

Patent Document 1: Korean Patent Registration No. 10-0412929 (published on May 31, 2004)

SUMMARY

Therefore, the present disclosure provides a filter cartridge which includes a cartridge header with a parallel type flow channel capable of using a plurality of filter bodies at the same time to increase filterability, to easily maintain and repair a filter, and to prevent an unnecessarily wasteful use of resources.

Additional aspects of the present disclosure will be set forth in part in the description which follows and, in part, will be obvious from the description, or may be learned by practice of the present disclosure.

In accordance with one aspect of the present disclosure, a parallel flow channel type filter cartridge includes a filter portion which includes a plurality of filter bodies and a plurality of filter housings corresponding to the plurality of filter bodies and independently accommodating the respective filter bodies and a cartridge header in which a top is formed in a structure in which a tap water pipe surrounds a perimeter of a purified water pipe which vertically protrudes, a plurality of filter accommodating pipes coupled with top ends of the plurality of filter housings which form the filter portion to seal an inside of the filter portion are formed at a bottom, and a parallel structure type flow channel which allows tap water which flows in through the tap water pipe to flow into the plurality of filter accommodating pipes at the same time and then allows the water purified while passing through the plurality of filter bodies to be discharged through the purified water pipe is formed therein.

The cartridge header may include a cartridge enlargement unit in which the plurality of filter accommodating pipes which each include a purified water inlet pipe into which purified water flows from a head of each of the filter bodies are formed on a bottom surface and the purified water and the tap water which flows in through the tap water pipe are allowed to move respective on a top surface, a bypass unit in which a tap water inlet space to which the tap water which flows in through the tap water pipe moves is formed to move the tap water to the cartridge enlargement unit and the purified water pipe through which the purified water which flows in through the cartridge enlargement unit passes vertically protrudes, and an upper cartridge cover in which the tap water pipe which surrounds the perimeter of the purified water pipe of the bypass unit is formed in a central portion on a top surface.

The cartridge enlargement unit may have a structure in which an inner partition wall with a perimeter integrally connected and an outer partition wall which surrounds the inner partition wall at a certain interval are formed on the top surface to allow the purified water to move in a center of the inner partition wall and to allow the tap water which flows in through the tap water pipe to move between the inner partition wall and the outer partition wall The bypass unit may have a structure in which an upper step formed of an upwardly protruding outer perimeter of a top surface is provided at an edge to form the tap water inlet space inside the upper step, a tap water outlet hole which moves the tap water to the cartridge enlargement unit is formed at each of edges of the tap water inlet space corresponding to the outer perimeter of the plurality of filter accommodating pipes, and the purified water pipe is formed in a center of the tap water inlet space while vertically protruding. The upper cartridge cover may have a structure in which a watertight partition wall corresponding to the upper step of the bypass unit is formed on a bottom surface to allow the tap water to flow in through a gap between an outer surface of the purified water pipe and an inner surface of the tap water pipe and an outer perimeter surrounds and seals the outer partition wall of the cartridge enlargement unit.

The cartridge enlargement unit may include a plurality of purified water outlet portions formed as single through holes respectively at positions corresponding the respective purified water inlet pipes formed in central portions of the plurality of filter accommodating pipes inside two or more semicircular edges of the inner partition wall and a plurality of tap water inlet portions disposed around the plurality of purified water outlet portions formed as the single through holes respectively between the inner partition wall and the outer partition wall at certain intervals to have arcs at certain angles and formed as a plurality of through holes respectively at positions corresponding to the tap water outlet holes of the bypass unit.

The bypass unit may be formed in a structure in which an end of the purified water pipe formed in the central portion of the top surface passes through an end of the tap water pipe formed in the upper cartridge cover, may include a plurality of partition walls corresponding to the inner partition wall and the outer partition wall formed on the top surface of the cartridge enlargement unit, on the bottom surface, and may have the bottom surface which covers and seals overall a top of the cartridge enlargement unit.

Annular sealing members may be formed at a perimeter of the end of the tap water pipe formed in the upper cartridge cover and a perimeter of the end of the purified water pipe formed in the bypass unit, respectively. A fitting groove may be formed at a perimeter of the tap water pipe to allow the tap water pipe to be nondirectionally coupled with a head portion of a filter assembly to which the filter cartridge is fastened.

The cartridge enlargement unit may have a structure in which two filter accommodating pipes which are adjacently disposed and have circular outer circumferences and linearly connected central portions are formed on the bottom surface, the top surface has a shape in which perimeters of longitudinal edges formed at tops of the two filter accommodating pipes are linearly connected, two purified water outlet portions formed as single through holes respectively are formed at positions on the top surface corresponding to central portions of the two filter accommodating pipes, the inner partition wall which integrally surrounds the two purified water outlet portions and has a caterpillar structure overall when viewed from above is formed on the top surface, the outer partition wall has a caterpillar structure in a shape corresponding to the inner partition wall and surrounds the inner partition wall at a certain interval, two tap water inlet portions formed as a plurality of through holes in semicircular shapes are formed outside the two purified water outlet portions between the inner partition wall and the outer partition wall. The bypass unit may have a caterpillar structure overall and a shape corresponding to the outer partition wall which surrounds the inner partition wall at the certain interval and may include a plurality of tap water outlet holes at positions corresponding to the two tap water inlet portions of the cartridge enlargement unit, respectively.

The cartridge enlargement unit may have a structure in which three filter accommodating pipes which are adjacently disposed and have circular outer circumferences and linearly connected central portions are formed on the bottom surface, the top surface has a shape in which perimeters of longitudinal edges formed at tops of the three filter accommodating pipes are linearly connected, three purified water outlet portions formed as single through holes respectively are formed at positions on the top surface corresponding to central portions of the three filter accommodating pipes, the inner partition wall which integrally surrounds the three purified water outlet portions and has a caterpillar structure overall when viewed from above is formed on the top surface, the outer partition wall has a caterpillar structure in a shape corresponding to the inner partition wall and surrounds the inner partition wall at a certain interval, three tap water inlet portions formed as a plurality of through holes in arc shapes are formed outside the three purified water outlet portions between the inner partition wall and the outer partition wall. The bypass unit may have a caterpillar structure overall and a shape corresponding to the outer partition wall which surrounds the inner partition wall at the certain interval and may include a plurality of tap water outlet holes at positions corresponding to the three tap water inlet portions of the cartridge enlargement unit, respectively.

The cartridge enlargement unit may have a structure in which three filter accommodating pipes which are disposed to allow edges to be adjacent to one another and have circular outer circumferences and triangularly connected central portions are formed on the bottom surface, the top surface has a shape in which perimeters of longitudinal edges formed at tops of the three filter accommodating pipes are connected as arcs in a three-leaf shamrock shape, three purified water outlet portions formed as single through holes respectively are formed at positions on the top surface corresponding to central portions of the three filter accommodating pipes, the inner partition wall which integrally surrounds the three purified water outlet portions is formed on the top surface, the outer partition wall surrounds the inner partition wall at a certain interval and has a three-leaf shamrock shape overall, three tap water inlet portions formed as a plurality of through holes in semicircular shapes are formed outside the three purified water outlet portions between the inner partition wall and the outer partition wall. The bypass unit may have a three-leaf shamrock structure overall and a shape corresponding to the outer partition wall which surrounds the inner partition wall at the certain interval and may include a plurality of tap water outlet holes at positions corresponding to the three tap water inlet portions of the cartridge enlargement unit, respectively.

The cartridge enlargement unit may have a structure in which four filter accommodating pipes which are sequentially disposed to be adjacent to one another and have circular outer circumferences and linearly connected central portions are formed on the bottom surface, the top surface has a shape in which perimeters of longitudinal edges formed at tops of the four filter accommodating pipes are linearly connected, four purified water outlet portions formed as single through holes respectively are formed at positions on the top surface corresponding to central portions of the four filter accommodating pipes, the inner partition wall which integrally surrounds the four purified water outlet portions and has a caterpillar structure overall when viewed from above is formed on the top surface, the outer partition wall has a caterpillar structure in a shape corresponding to the inner partition wall and surrounds the inner partition wall at a certain interval, four tap water inlet portions formed as a plurality of through holes in arc shapes are formed outside the four purified water outlet portions between the inner partition wall and the outer partition wall. The bypass unit may have a caterpillar structure overall and a shape corresponding to the outer partition wall which surrounds the inner partition wall at the certain interval and may include a plurality of tap water outlet holes at positions corresponding to the four tap water inlet portions of the cartridge enlargement unit, respectively.

The cartridge enlargement unit may have a structure in which four filter accommodating pipes which are sequentially disposed to be adjacent to one another and have circular outer circumferences and rectangularly connected central portions are formed on the bottom surface, the top surface has a shape in which perimeters of longitudinal edges formed at tops of the four filter accommodating pipes are connected as arcs in a four-lead shamrock shape, four purified water outlet portions formed as single through holes respectively are formed at positions on the top surface corresponding to central portions of the four filter accommodating pipes, the inner partition wall which integrally surrounds the four purified water outlet portions and has a X-shape when viewed from above is formed on the top surface, the outer partition wall surrounds the inner partition wall at a certain interval and has a four-leaf shamrock shape overall, four tap water inlet portions formed as a plurality of through holes in arc shapes are formed outside the four purified water outlet portions between the inner partition wall and the outer partition wall. The bypass unit may have a four-leaf shamrock shaped perimeter overall and a shape corresponding to the outer partition wall which surrounds the inner partition wall at the certain interval and may include a plurality of tap water outlet holes at positions corresponding to the four tap water inlet portions of the cartridge enlargement unit, respectively.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Since embodiments of the present invention are merely examples for structural or functional description, the scope of the present invention will not be limited to the embodiments described herein. That is, since the embodiments may be variously modified and may have various forms, the scope of the present invention will be understood as including equivalents thereof which can embody technical concept thereof.

Meanwhile, the meaning of the terms used herein will be understood as follows.

Since the terms "first", "second", etc. may be used herein to distinguish one component from another, the scope of the present invention should not be limited by these terms. For example, a first component may be referred to as a second component, and similarly, the second component may be referred to as the first component.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components. Meanwhile, other expressions which describe relationships between components, that is, "between" and "directly between" or "adjacent to" and "directly adjacent to" will be also understood similarly thereto.

Singular expressions, unless defined otherwise, should be understood as including plural expressions. It will be understood that the terms "comprise" and/or "have" used herein specify the presence of stated features, numbers, steps, operations, elements, components or combinations thereof but not to preclude the presence or addition of one or more other features, numbers, steps, operations, elements, components, or combinations thereof.

In respective steps, reference symbols, for example, a, b, c, etc. are used for convenience of description. These reference symbols do not indicate an order of the respective steps. The respective steps, unless defined clearly in contexts, may be performed differently from a stated order. That is, the respective steps may be performed identically to the stated order, may be performed substantially at the same time, or may be performed in the reverse order.

All the terms used herein, unless defined otherwise, have the same meaning generally understood by one of ordinary skill in the art. Terms defined in generally used dictionaries should be understood as contextual meanings generally known in the art and, unless defined clearly in the specification, will not be understood as having ideally or excessively formal meanings.

Hereinafter, the embodiments of the present invention will be described in detail with reference to the attached drawings.

Figure 1:
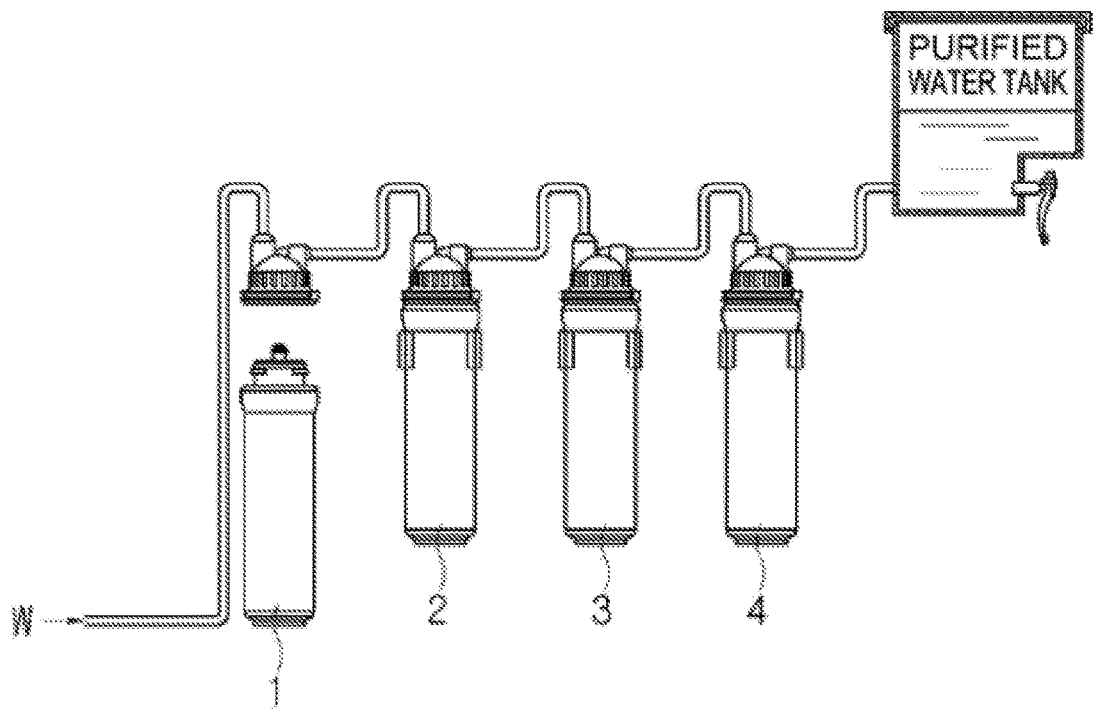
FIG. 1 is a configuration diagram of a water purifier which includes a plurality of water purifying filters installed therein according to a conventional art.
Figure 2:
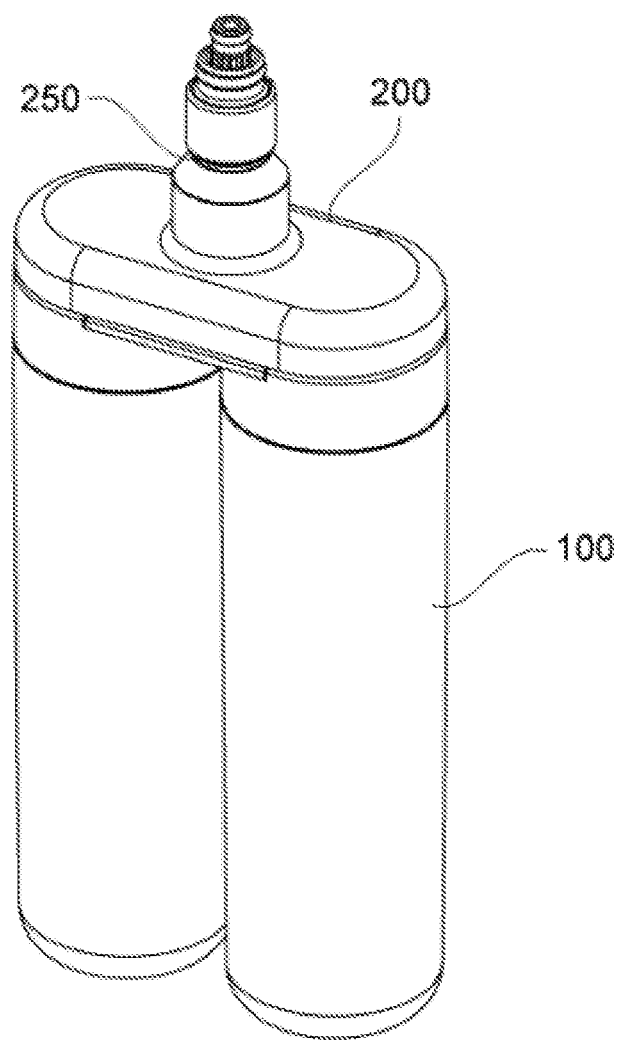
FIGS. 2 and 3 are views of a parallel flow channel type filter cartridge including two filter bodies according to a first embodiment of the present invention.
Figure 3:
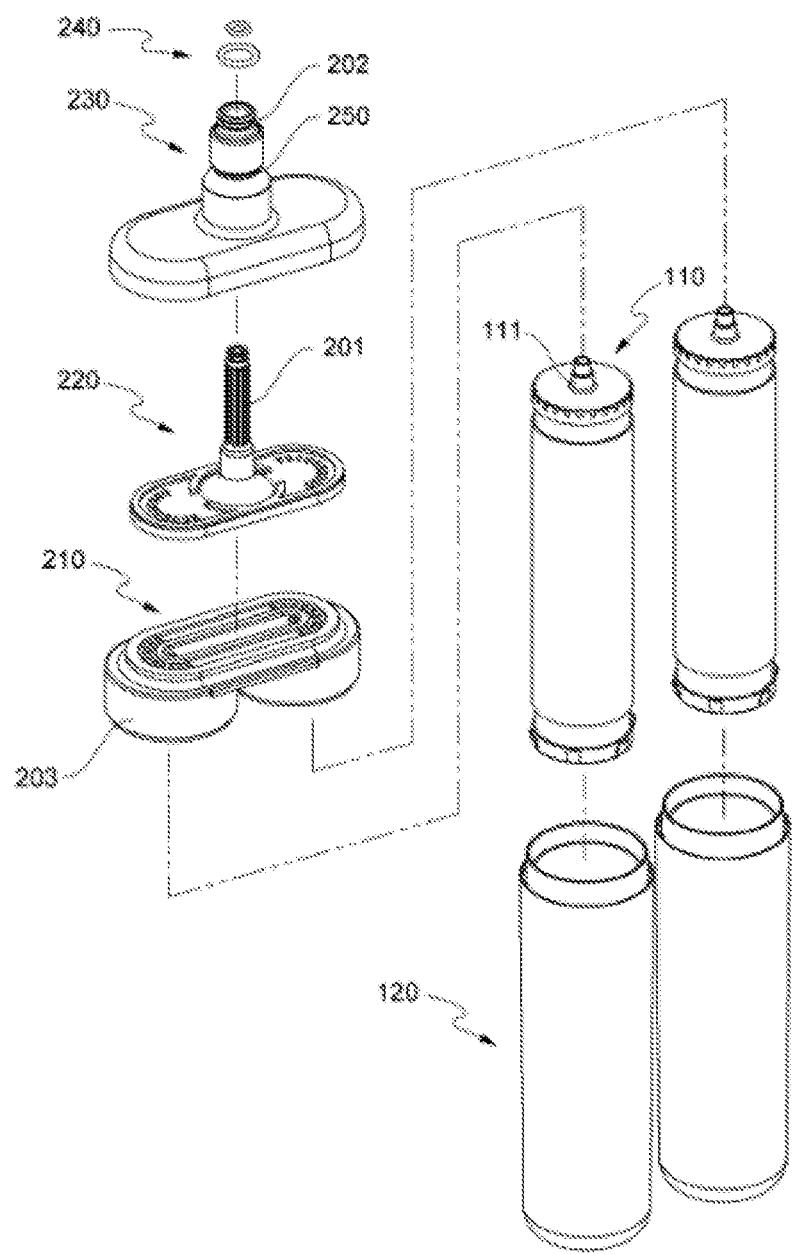

FIGS. 2 and 3 are views of a parallel flow channel type filter cartridge including two filter bodies according to a first embodiment of the present invention.

As shown in the drawings, the parallel flow channel type filter cartridge according to the first embodiment of the present invention may include a filter portion 100 and a cartridge header 200.

In more detail, the filter portion 100 may include a plurality of filter bodies 110 and a plurality of filter housings 120 corresponding to the plurality of filter bodies 110 and independently accommodating the respective filter bodies 110.

Here, as shown in the drawings, in the parallel flow channel type filter cartridge according to the first embodiment of the present invention, even though being separated respectively and corresponding to the respective filter bodies 110 one by one, the plurality of filter housings 120 may be embodied as a single housing which includes inner spaces which independently accommodate the respective filter bodies 110 corresponding to one another and has an integrally formed external case, which will be identically applied to second to fifth embodiments below.

Also, in the cartridge header 200, as shown in the drawings, a structure in which a single tap water pipe 202 surrounds a perimeter of a single purified water pipe 201 which vertically protrudes may be formed at a top and a plurality of filter accommodating pipes 203 respectively coupled with top ends of the plurality of filter housings 120 which form the filter portion 100 to seal an inside of the filter portion 100 may be formed at a bottom.

Here, in the cartridge header 200, a parallel structure type flow channel which allows tap water which flows in through the single tap water pipe 202 to flow into the plurality of filter accommodating pipes 203 at the same time and then allows water purified while passing through the plurality of filter bodies 110 to be discharged through the single purified water pipe 201 may be formed.

Meanwhile, as shown in the drawings, it may be known that the filter cartridge according to the first embodiment of the present invention includes annular sealing members 240 formed at a perimeter of an end of the single tap water pipe 202 and a perimeter of an end of the single purified water pipe 201 respectively and a circular fitting groove 250 formed at the perimeter of the single tap water pipe 202 to allow the tap water pipe 202 to be nondirectionally coupled with a head portion of a filter assembly to which the filter cartridge is fastened.

Figure 4:
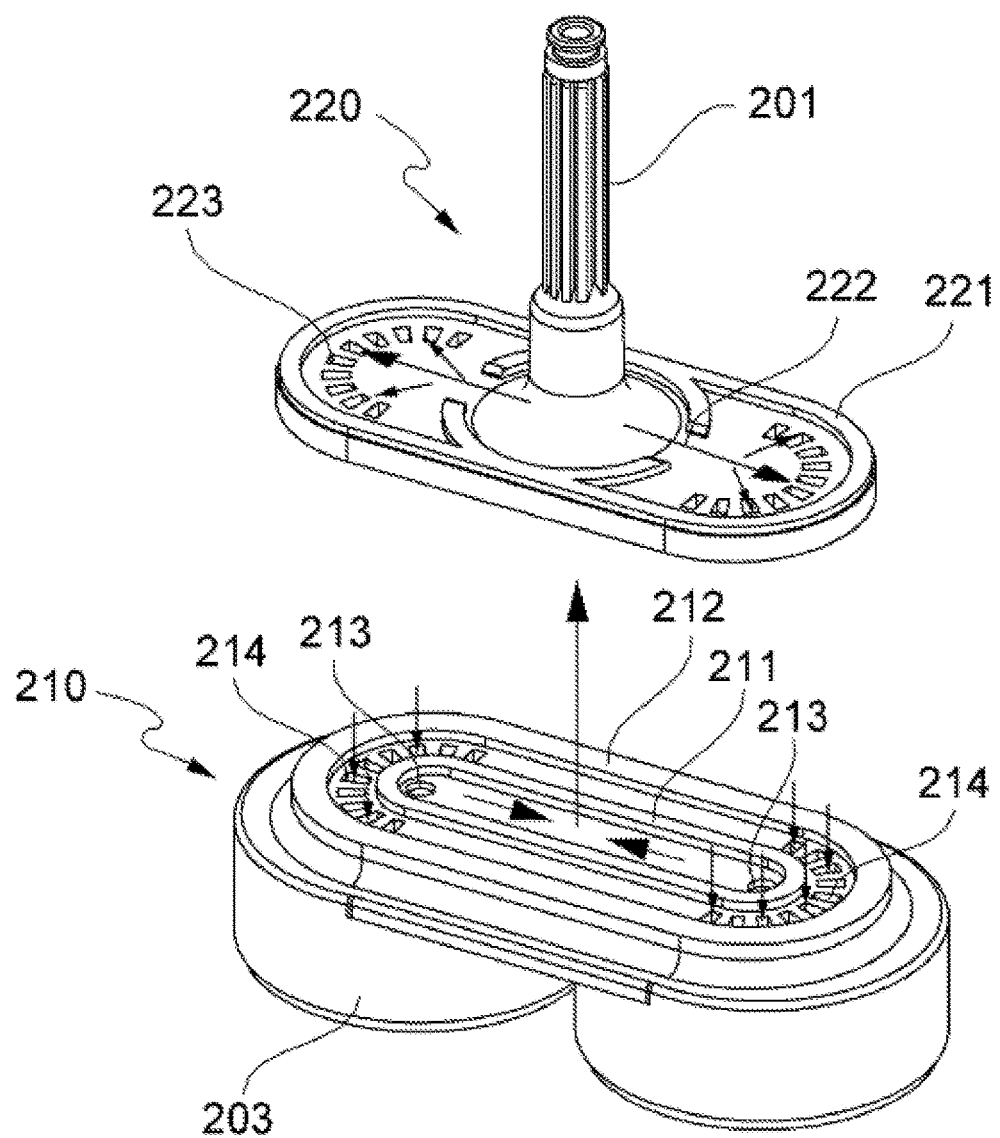
FIGS. 4 and 5 are an exploded view and cross-sectional perspective view of a parallel structure type flow channel formed inside a cartridge header according to the first embodiment of the present invention.
Figure 5:
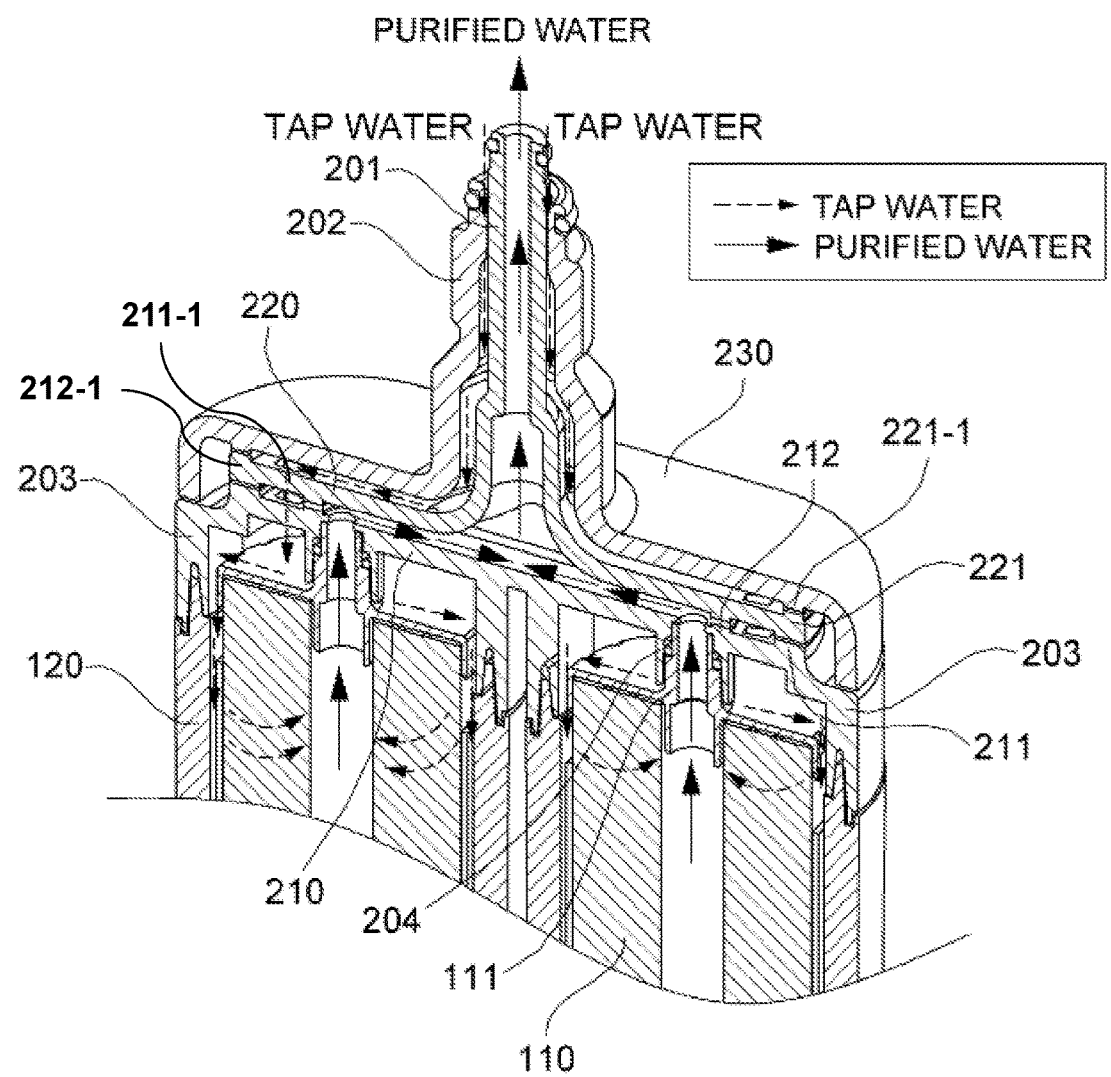

FIGS. 4 and 5 are an exploded view and cross-sectional perspective view of a parallel structure type flow channel formed inside a cartridge header according to the first embodiment of the present invention.

Referring to FIGS. 4 and 5, a detailed configuration in the cartridge header 200 for forming the parallel structure type flow channel applied to the parallel flow channel type filter cartridge according to the first embodiment of the present invention will be described below in detail.

As shown in the drawings, the cartridge header 200 according to the first embodiment of the present invention may include a cartridge enlargement unit 210 and a bypass unit 220.

In the embodiment, the cartridge enlargement unit 210 may include an inner partition wall 211 which includes a semicircular edge of both ends and an integrally connected perimeter and an outer partition wall 212 which surrounds the inner partition wall 211 at a certain interval at a top surface.

Here, the purified water may be allowed to move through a center of the inner partition wall 211 and the tap water which flows in through the single tap water pipe 202 may be allowed to move between the inner partition wall 211 and the outer partition wall 212.

Also, the cartridge enlargement unit 210 may include the plurality of filter accommodating pipes 203 which each include a purified water inlet pipe 204 through which the purified water flows in from a head 111 of each of the filter bodies 110 and are formed at a bottom surface.

In more detail, the cartridge enlargement unit 210 may include a plurality of purified water outlet portions 213 each formed as a single through hole at a position corresponding to each of the purified water inlet pipes 204 formed in a central portion of each of the plurality of filter accommodating pipes 203, inside the semicircular edge formed at the both ends of the inner partition wall 211.

Also, the cartridge enlargement unit 210 may include a plurality of tap water inlet portions 214 disposed around the plurality of purified water outlet portions 213 respectively formed as the single through holes between the inner partition wall 211 and the outer partition wall 212 at certain intervals to have an arc at a certain angle and respectively formed as a plurality of through holes at positions corresponding to tap water outlet holes 223 of the bypass unit 220.

Meanwhile, in the embodiment, the bypass unit 220 may include an upper step 221 formed of an upwardly protruding outer perimeter of a top surface at an edge to form a tap water inlet space 222 to which the tap water flowing in through the single tap water pipe 202 moves inside the upper step 221.

Here, a plurality of such tap water outlet holes 223 respectively formed in semicircular shapes corresponding to an outer perimeter of the plurality of filter accommodating pipes 203 to move the tap water to the cartridge enlargement unit 210 may be formed at both ends of an edge of the tap water inlet space 222.

Also, in the bypass unit 220, as shown in the drawings, the single purified water pipe 201 through which the purified water flowing in through the cartridge enlargement unit 210 passes may vertically protrude in a central portion of the tap water inlet space 222.

Also, the bypass unit 220 may be formed as a structure in which the end of the single purified water pipe 201 formed in a central portion of the top surface passes through the end of the single tap water pipe 202 formed at an upper cartridge cover 230 which will be described below.

Also, the bypass unit 220 may include a plurality of partition walls 211-1 and 212-1 formed on a bottom surface, corresponding to the inner partition wall 211 and the outer partition wall 212 formed on a top surface of the cartridge enlargement unit 210, and may be formed as a structure in which the bottom surface covers and seals overall a top of the cartridge enlargement unit 210 as shown in the drawings.

Meanwhile, the parallel flow channel type filter cartridge according to the first embodiment of the present invention may include the upper cartridge cover 230 formed having a structure in which the single tap water pipe 202 surrounding the perimeter of the single purified water pipe 201 formed at the bypass unit 220 is formed in a central portion of a top surface, a watertight partition wall 221-1 corresponding to the upper step 221 of the bypass unit 220 is formed on a bottom surface, and an outer perimeter of the bottom surface surrounds and seals the outer partition wall 212 of the cartridge enlargement unit 210, as shown in FIG. 3.

Accordingly, the parallel flow channel type filter cartridge according to the first embodiment of the present invention may allow the tap water to flow into the cartridge header 200 through a gap between an outer surface of the single purified water pipe 201 and an inner surface of the single tap water pipe 202 due to the upper cartridge cover 230.

Also, to describe a water purifying process using the parallel flow channel type filter cartridge according to the first embodiment of the present invention referring to FIG. 5, first, when the tap water flows in through the single tap water pipe 202 which forms the upper cartridge cover 230, the tap water may flow into the tap water inlet portion 214 of the cartridge enlargement unit 210 through the tap water inlet space 222 and the tap water outlet holes 223 formed at the bypass unit 220 and the tap water which flows into the tap water inlet portion 214 may be purified while passing through the filter body 110 of the filter portion 100 coupled with the filter accommodating pipe 203.

Next, when the water purified through the head 111 of the filter body 110 is discharged into the purified water outlet portion 213 of the cartridge enlargement unit 210 through the purified water inlet pipe 204 of the filter accommodating pipe 203, the purified water is discharged through the purified water pipe 201 formed in the bypass unit 220 along a moving space formed in the central portion of the top surface of the cartridge enlargement unit 210 by the inner partition wall 211 of the cartridge enlargement unit 210.

That is, to form the water purifying process using the parallel flow channel structure described above, the parallel flow channel type filter cartridge according to the first embodiment, as described above, may include two filter portions 100 by forming two filter accommodating pipes 203 with circular outer circumferences and central portions linearly connected, adjacent to each other, at a bottom surface of the cartridge enlargement unit 210.

Here, the top surface of the cartridge enlargement unit 210 is formed to have a shape in which perimeters of longitudinal edges formed at tops of the two filter accommodating pipes 203 are linearly connected to form a horizontal plane for forming a flow channel. Two purified water outlet portions 213 formed as single through holes respectively may be formed at positions on the top surface corresponding to central portions of the two filter accommodating pipes 203.

Also, the cartridge enlargement unit 210 may provide the moving space of the purified water by forming the inner partition wall 211 which integrally surrounds the two purified water outlet portions 213 and totally has a caterpillar structure when viewed from above, on the top surface.

In addition, the cartridge enlargement unit 210 may form the outer partition wall 212 in a structure which has a caterpillar structure corresponding to the inner partition wall 211 and surrounds the inner partition wall 211 at the certain interval and may provide a space for temporarily storing the tap water when the tap water which flows into the upper cartridge cover 230 described above flows in through the bypass unit 220.

Here, the cartridge enlargement unit 210 may form two tap water inlet portions 214 which have semicircular shapes and formed of a plurality of through holes outside the two purified water outlet portions 213 between the inner partition wall 211 and the outer partition wall 212.

Also, an outer perimeter of the bypass unit 220 may have a caterpillar structure and may be formed in a shape corresponding to the outer partition wall 212 in a structure of surrounding the inner partition wall 211 at the certain interval.

Here, the bypass unit 220 may include the plurality of tap water outlet holes 223 at positions corresponding to the two tap water inlet portions 214 of the cartridge enlargement unit 210, respectively.

Figure 6:
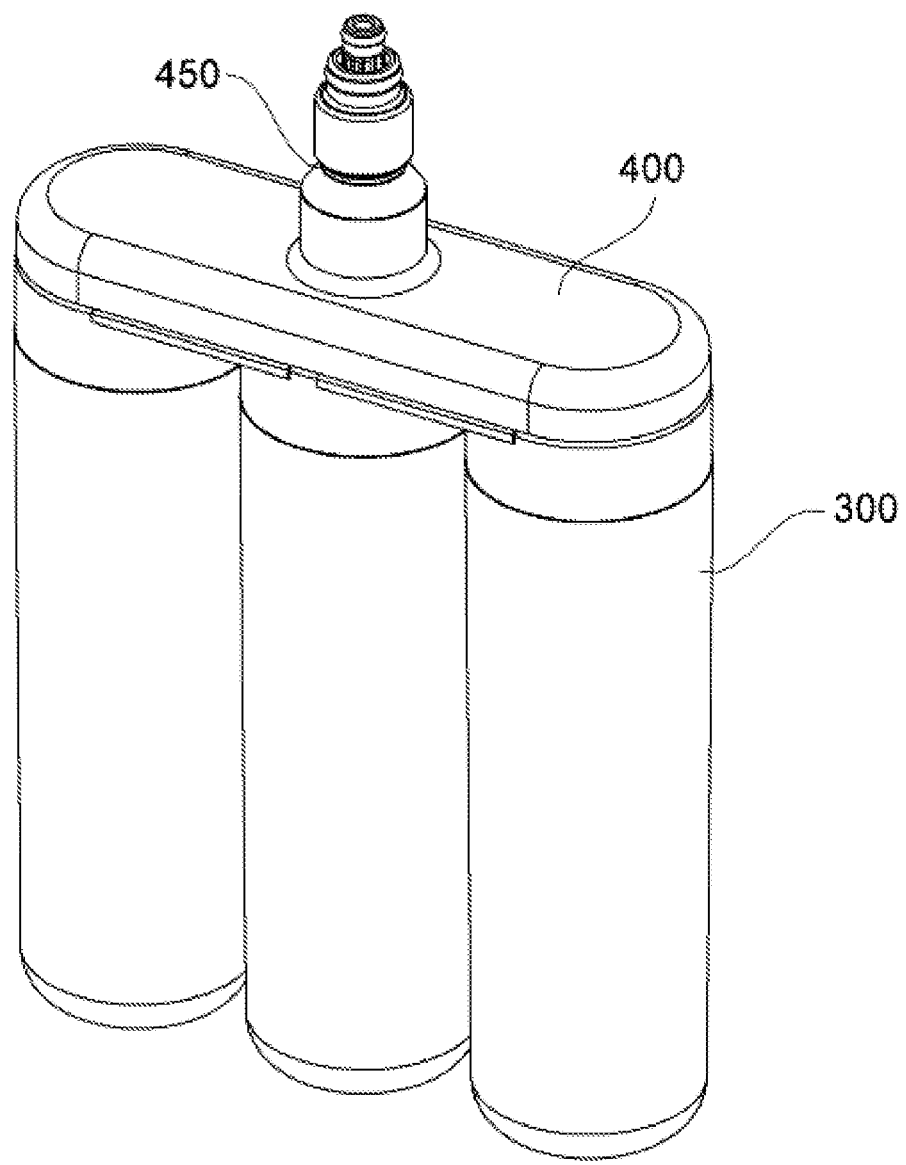
FIGS. 6 and 7 are views of a parallel flow channel type filter cartridge including three linearly combined filter bodies according to a second embodiment of the present invention.
Figure 7:
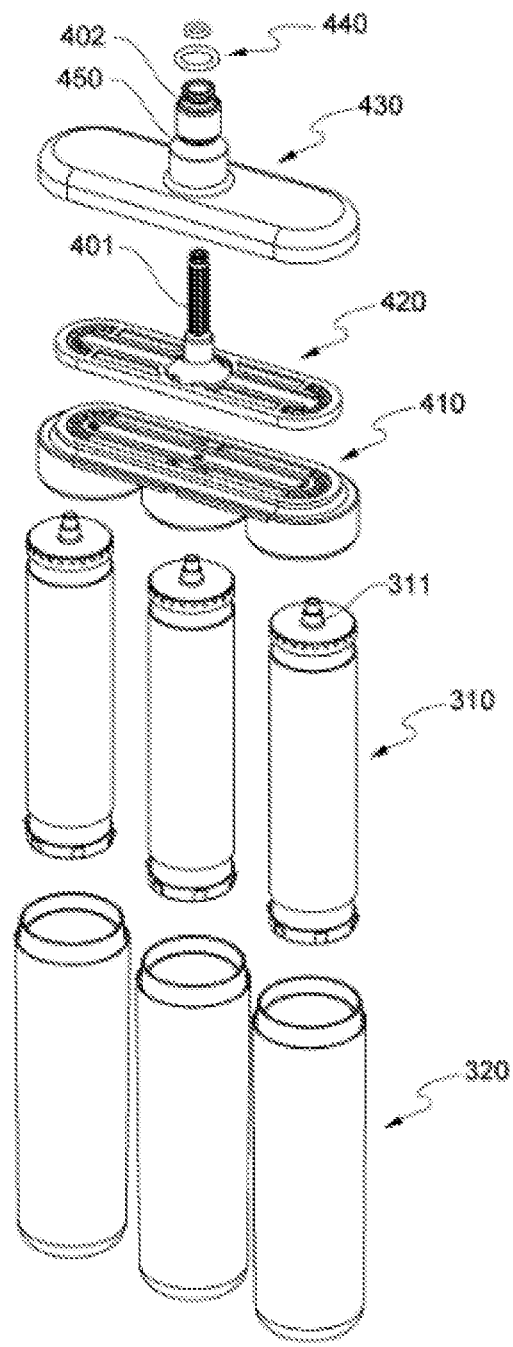

FIGS. 6 and 7 are views of a parallel flow channel type filter cartridge including three linearly combined filter bodies according to a second embodiment of the present invention.

As shown in the drawings, the parallel flow channel type filter cartridge according to the second embodiment of the present invention may include a filter portion 300 and a cartridge header 400.

In more detail, the filter portion 300 may include a plurality of filter bodies 310 and a plurality of filter housings 320 corresponding to the plurality of filter bodies 310 and independently accommodating the respective filter bodies 310.

Also, in the cartridge header 400, as shown in the drawings, a structure in which a single tap water pipe 402 surrounds a perimeter of a single purified water pipe 401 which vertically protrudes may be formed at a top and a plurality of filter accommodating pipes 403 respectively coupled with top ends of the plurality of filter housings 320 which form the filter portion 300 to seal an inside of the filter portion 300 may be formed at a bottom.

Here, in the cartridge header 400, a parallel structure type flow channel which allows tap water which flows in through the single tap water pipe 402 to flow into the plurality of filter accommodating pipes 403 at the same time and then allows the water purified while passing through the plurality of filter bodies 310 to be discharged through the single purified water pipe 401 may be formed.

Meanwhile, as shown in the drawings, it may be known that the filter cartridge according to the second embodiment of the present invention includes annular sealing members 440 formed at a perimeter of an end of the single tap water pipe 402 and a perimeter of an end of the single purified water pipe 401 respectively and a circular fitting groove 450 formed at the perimeter of the single tap water pipe 402 to allow the tap water pipe 402 to be nondirectionally coupled with a head portion of a filter assembly to which the filter cartridge is fastened.

Figure 8:
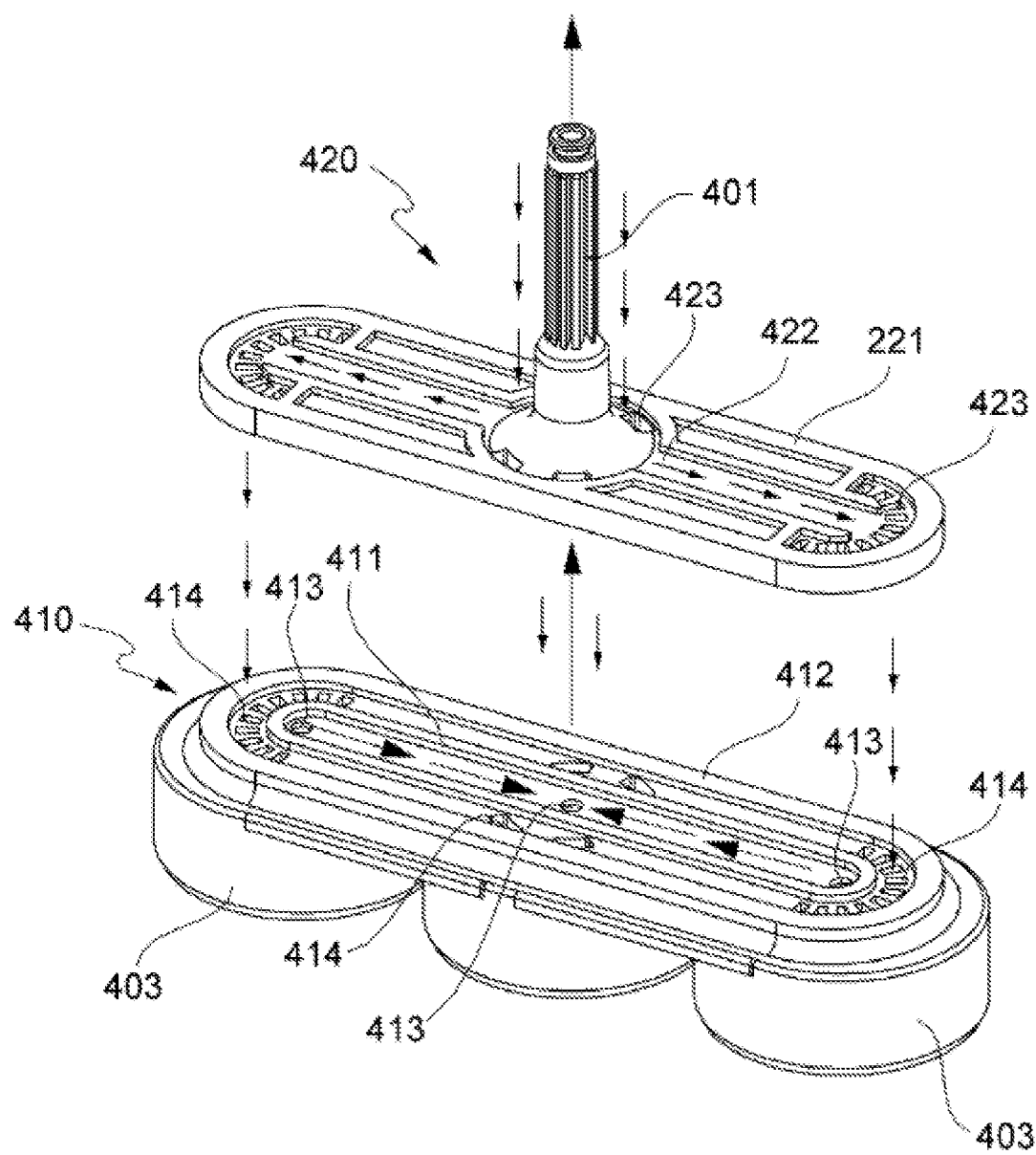
FIGS. 8 and 9 are an exploded view and cross-sectional perspective view of a parallel structure type flow channel formed inside a cartridge header according to the second embodiment of the present invention.
Figure 9:
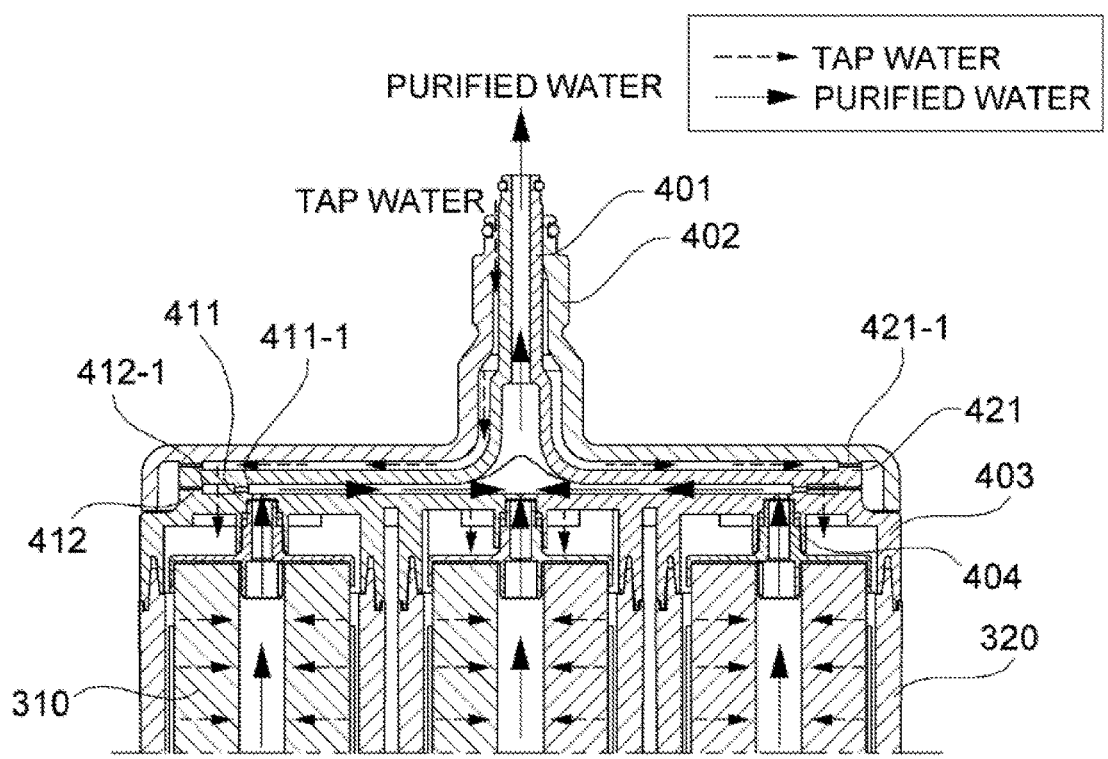

FIGS. 8 and 9 are an exploded view and cross-sectional perspective view of a parallel structure type flow channel formed inside a cartridge header according to the second embodiment of the present invention.

Referring to FIGS. 8 and 9, a detailed configuration in the cartridge header 400 for forming the parallel structure type flow channel applied to the parallel flow channel type filter cartridge according to the second embodiment of the present invention will be described below in detail.

As shown in the drawings, the cartridge header 400 according to the second embodiment of the present invention may include a cartridge enlargement unit 410 and a bypass unit 420.

In the embodiment, the cartridge enlargement unit 410 may include an inner partition wall 411 which includes a semicircular edge of both ends and an integrally connected perimeter and an outer partition wall 412 which surrounds the inner partition wall 411 at a certain interval at a top surface.

Here, the purified water may be allowed to move through a center of the inner partition wall 411 and the tap water which flows in through the single tap water pipe 402 may be allowed to move between the inner partition wall 411 and the outer partition wall 412.

Also, the cartridge enlargement unit 410 may include the plurality of filter accommodating pipes 403 which each include a purified water inlet pipe 404 through which the purified water flows in from a head 311 of each of the filter bodies 310 and are formed at a bottom surface.

In more detail, the cartridge enlargement unit 410 may include a plurality of purified water outlet portions 413 each formed as a single through hole at a position corresponding to each of the purified water inlet pipes 404 formed in a central portion of each of the plurality of filter accommodating pipes 403, inside the semicircular edge formed at the both ends of the inner partition wall 411.

Also, the cartridge enlargement unit 410 may include a plurality of tap water inlet portions 414 disposed around the plurality of purified water outlet portions 413 respectively formed as the single through holes between the inner partition wall 411 and the outer partition wall 412 at certain intervals to have an arc at a certain angle and respectively formed as a plurality of through holes at positions corresponding to tap water outlet holes 423 of the bypass unit 420.

Here, as shown in the drawings, outside an edge of both ends of the inner partition wall 411, the plurality of tap water inlet portions 414 are formed in semicircular shapes and the tap water inlet portions 414 formed of two pairs of through holes are provided at an outer perimeter of a center of the inner partition wall 411 while forming arcs and facing each other.

Meanwhile, in the embodiment, the bypass unit 420 may include an upper step 421 formed of an upwardly protruding outer perimeter of a top surface at an edge to form a tap water inlet space 422 to which the tap water flowing in through the single tap water pipe 402 moves inside the upper step 421.

Here, a plurality of such tap water outlet holes 423 respectively formed in semicircular shapes and arc shapes corresponding to an outer perimeter of the plurality of filter accommodating pipes 403 to move the tap water to the cartridge enlargement unit 410 may be formed at a perimeter of both ends and a central portion of the tap water inlet space 422.

Also, in the bypass unit 420, as shown in the drawings, the single purified water pipe 401 through which the purified water flowing in through the cartridge enlargement unit 410 passes may vertically protrude in a central portion of the tap water inlet space 422.

Also, the bypass unit 420 may be formed as a structure in which the end of the single purified water pipe 401 formed in a central portion of the top surface passes through the end of the single tap water pipe 402 formed at an upper cartridge cover 430 which will be described below.

Also, the bypass unit 420 may include a plurality of partition walls 411-1 and 412-1 formed on a bottom surface, corresponding to the inner partition wall 411 and the outer partition wall 412 formed on a top surface of the cartridge enlargement unit 410 and may be formed as a structure in which the bottom surface covers and seals overall a top of the cartridge enlargement unit 410 as shown in the drawings.

Meanwhile, the parallel flow channel type filter cartridge according to the second embodiment of the present invention may include the upper cartridge cover 430 formed having a structure in which the single tap water pipe 402 surrounding the perimeter of the single purified water pipe 401 formed at the bypass unit 420 is formed in a central portion of a top surface, a watertight partition wall 421-1 corresponding to the upper step 421 of the bypass unit 420 is formed on a bottom surface, and an outer perimeter of the bottom surface surrounds and seals the outer partition wall 412 of the cartridge enlargement unit 410, as shown in FIG. 7.

Accordingly, the parallel flow channel type filter cartridge according to the second embodiment of the present invention may allow the tap water to flow into the cartridge header 400 through a gap between an outer surface of the single purified water pipe 401 and an inner surface of the single tap water pipe 402 due to the upper cartridge cover 430.

Also, to describe a water purifying process using the parallel flow channel type filter cartridge according to the second embodiment of the present invention referring to FIGS. 8 and 9, first, when the tap water flows in through the single tap water pipe 402 which forms the upper cartridge cover 430, the tap water may flow into the tap water inlet portion 414 of the cartridge enlargement unit 410 through the tap water inlet space 422 and the tap water outlet holes 423 formed at the bypass unit 420 and the tap water which flows into the tap water inlet portion 414 may be purified while passing through the filter body 310 of the filter portion 300 coupled with the filter accommodating pipe 403.

Next, when the water purified through a head 311 of the filter body 310 is discharged into the purified water outlet portion 413 of the cartridge enlargement unit 410 through the purified water inlet pipe 404 of the filter accommodating pipe 403, the purified water is discharged through the purified water pipe 401 formed in the bypass unit 420 along a moving space formed in the central portion of the top surface of the cartridge enlargement unit 410 by the inner partition wall 411 of the cartridge enlargement unit 410.

That is, to form the water purifying process using the parallel flow channel structure described above, the parallel flow channel type filter cartridge according to the second embodiment, as described above, may include three filter portions 300 by sequentially forming and adjacently disposing three filter accommodating pipes 403 with circular outer circumferences and central portions linearly connected at the bottom surface of the cartridge enlargement unit 410.

Here, the top surface of the cartridge enlargement unit 410 may be formed to have a shape in which perimeters of longitudinal edges formed at tops of the three filter accommodating pipes 403 are linearly connected to form a horizontal plane for forming a flow channel. Three purified water outlet portions 413 formed as single through holes respectively may be formed at positions on the top surface corresponding to central portions of the three filter accommodating pipes 403.

Also, the cartridge enlargement unit 410 may provide the moving space of the purified water by forming the inner partition wall 411 which integrally surrounds the three purified water outlet portions 413 and totally has a caterpillar structure when viewed from above, on the top surface.

In addition, the cartridge enlargement unit 410 may form the outer partition wall 412 in a structure which has a caterpillar structure corresponding to the inner partition wall 411 and surrounds the inner partition wall 411 at a certain interval and may provide a space for temporarily storing the tap water when the tap water which flows into the upper cartridge cover 430 described above flows in through the bypass unit 420.

Here, the cartridge enlargement unit 410 may form three tap water inlet portions 414 which are formed of a plurality of through holes and have semicircular shapes and arc shapes respectively, outside the inner partition wall 411 at which the three purified water outlet portions 413 are formed between the inner partition wall 411 and the outer partition wall 412.

Also, an outer perimeter of the bypass unit 420 may have a totally caterpillar structure and may be formed in a shape corresponding to the outer partition wall 412 in a structure of surrounding the inner partition wall 411 at the certain interval.

Here, the bypass unit 420 may include the plurality of tap water outlet holes 423 at positions corresponding to the three tap water inlet portions 414 of the cartridge enlargement unit 410, respectively.

Figure 10:
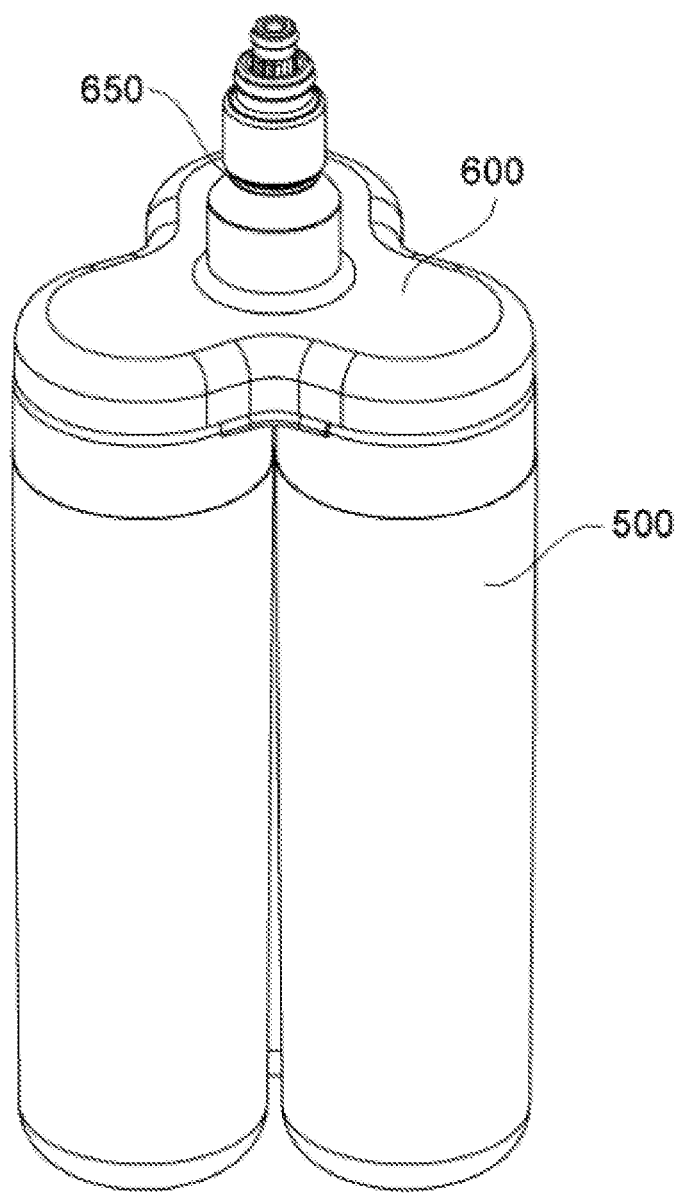
FIGS. 10 and 11 are views of a parallel flow channel type filter cartridge including three triangularly combined filter bodies according to a third embodiment of the present invention.
Figure 11:
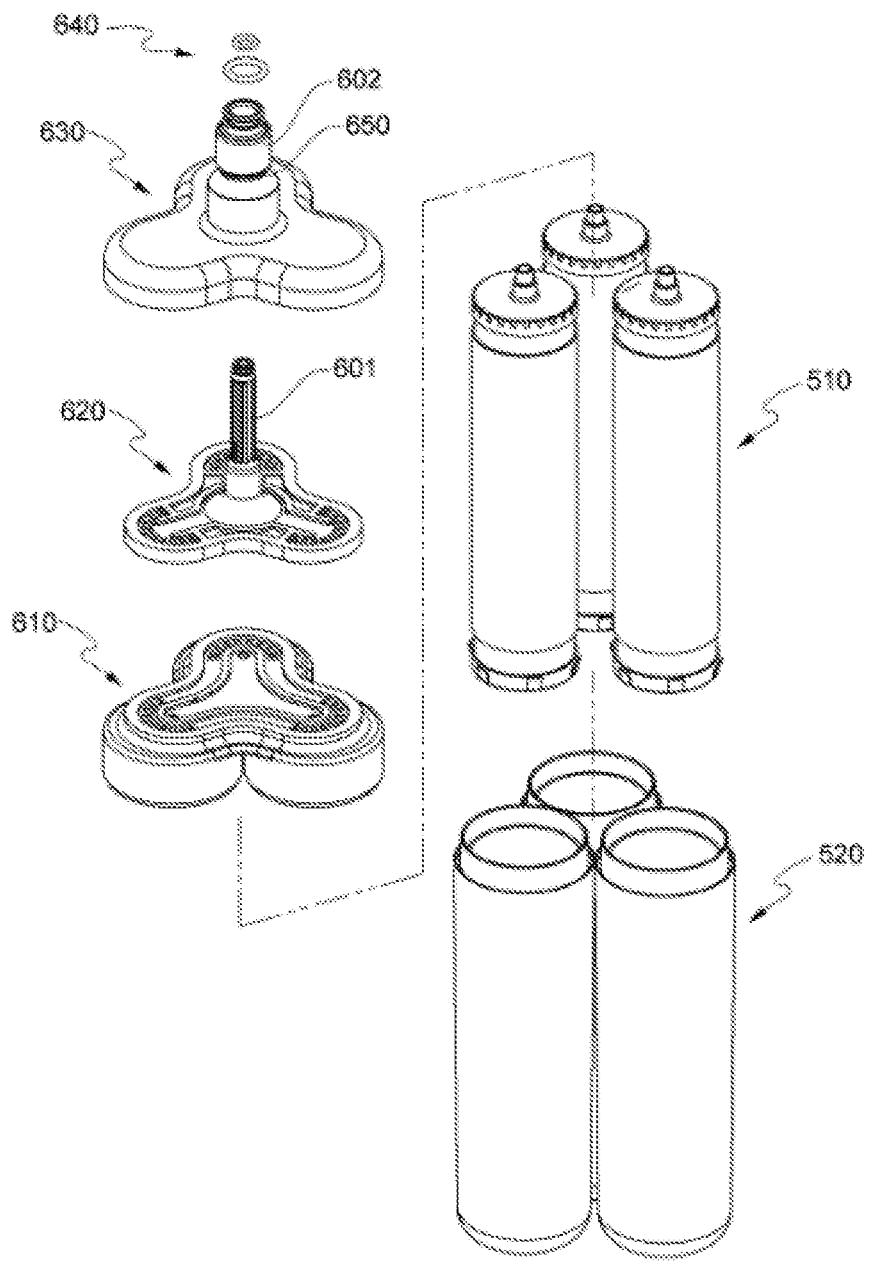

FIGS. 10 and 11 are views of a parallel flow channel type filter cartridge including three triangle type filter bodies according to a third embodiment of the present invention.

As shown in the drawings, the parallel flow channel type filter cartridge according to the third embodiment of the present invention may include a filter portion 500 and a cartridge header 600.

In more detail, the filter portion 500 may include a plurality of filter bodies 510 and a plurality of filter housings 520 corresponding to the plurality of filter bodies 510 and independently accommodating the respective filter bodies 510.

Also, in the cartridge header 600, as shown in the drawings, a structure in which a single tap water pipe 602 surrounds a perimeter of a single purified water pipe 601 which vertically protrudes may be formed at a top and a plurality of filter accommodating pipes 603 respectively coupled with top ends of the plurality of filter housings 520 which form the filter portion 500 to seal an inside of the filter portion 500 may be formed at a bottom.

Here, in the cartridge header 600, a parallel structure type flow channel which allows tap water which flows in through the single tap water pipe 602 to flow into the plurality of filter accommodating pipes 603 at the same time and then allows the water purified while passing through the plurality of filter bodies 510 to be discharged through the single purified water pipe 601 may be formed.

Meanwhile, as shown in the drawings, it may be known that the filter cartridge according to the third embodiment of the present invention includes annular sealing members 640 formed at a perimeter of an end of the single tap water pipe 602 and a perimeter of an end of the single purified water pipe 601 respectively and a circular fitting groove 650 formed at the perimeter of the single tap water pipe 602 to allow the tap water pipe 602 to be nondirectionally coupled with a head portion of a filter assembly to which the filter cartridge is fastened.

Figure 12:
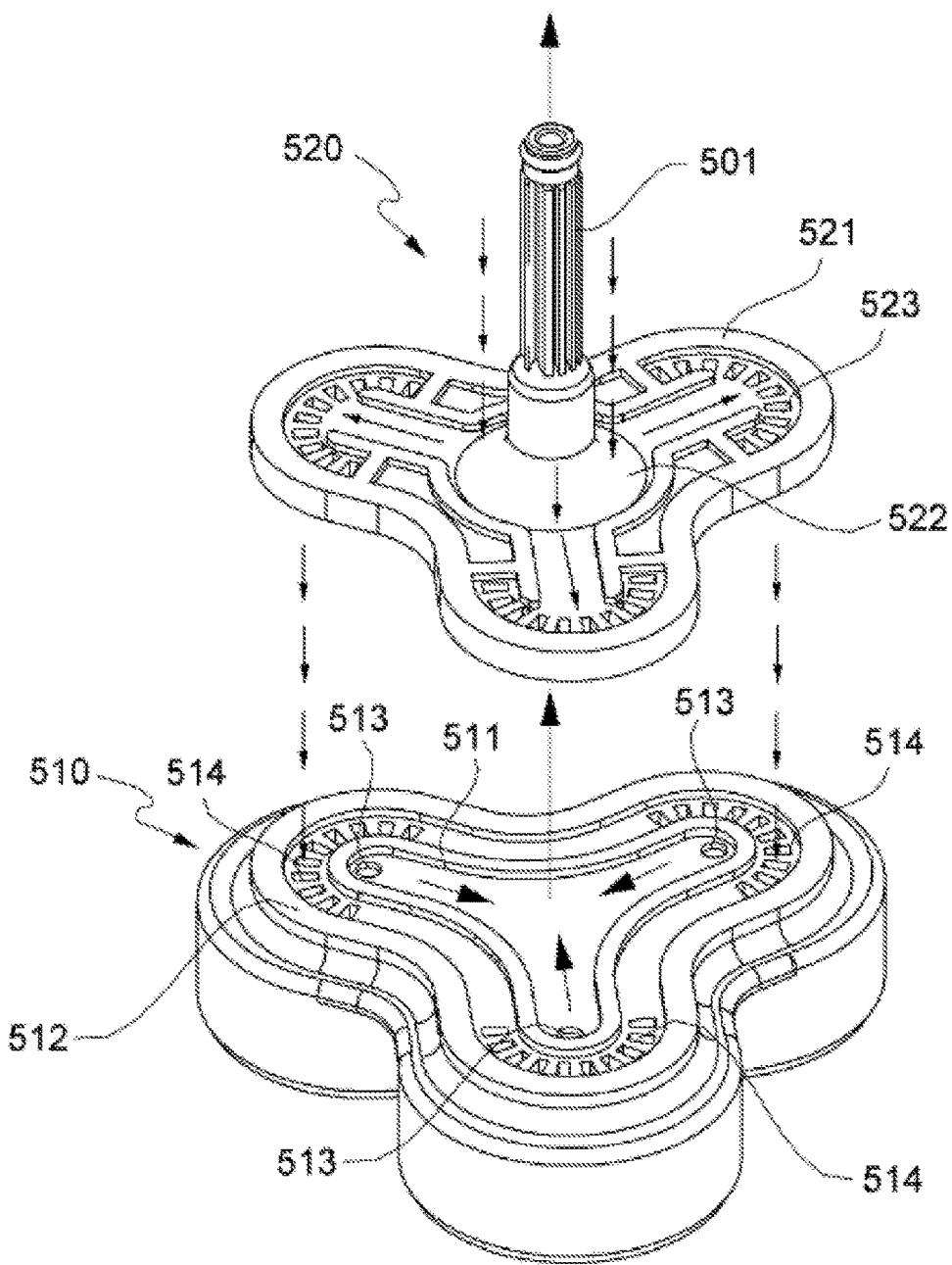
FIGS. 12 and 13 are an exploded view and cross-sectional perspective view of a parallel structure type flow channel formed inside a cartridge header according to the third embodiment of the present invention.
Figure 13:
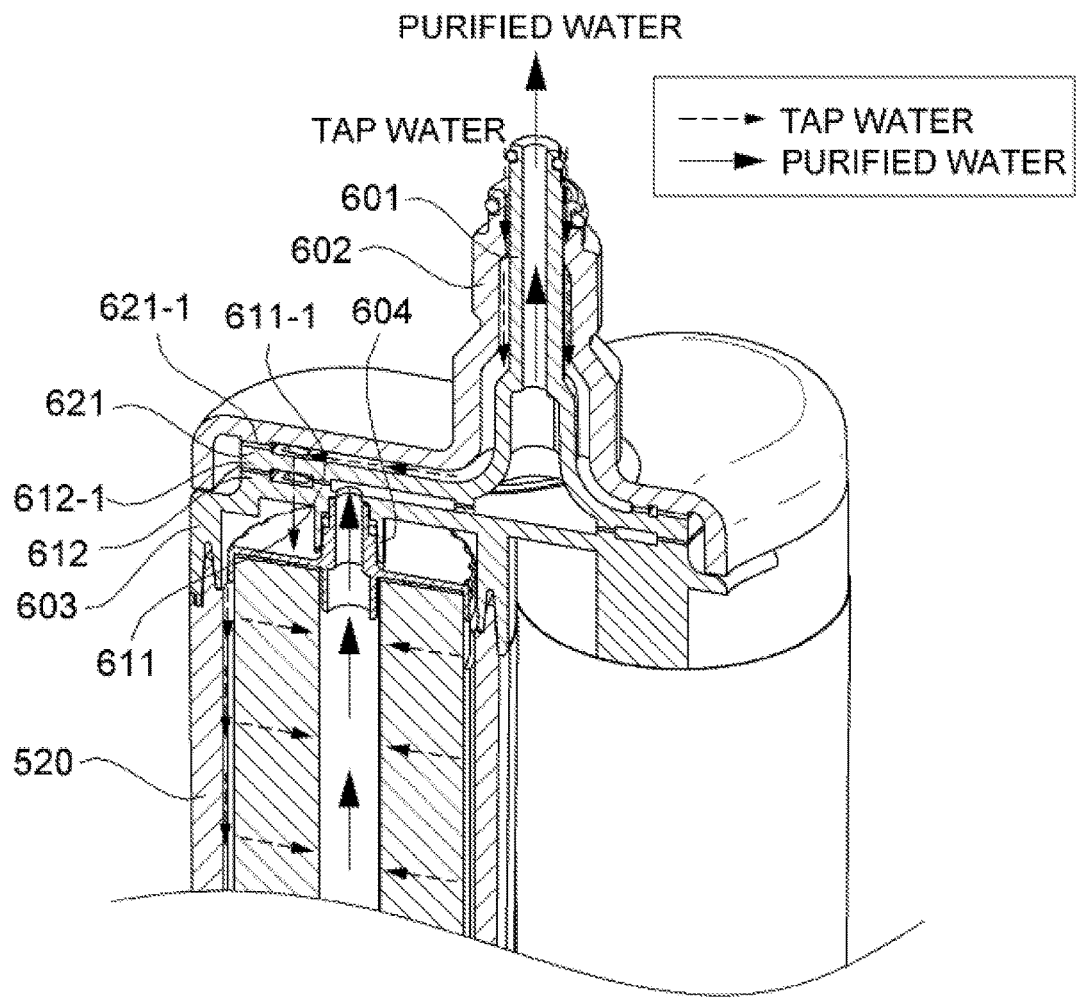

FIGS. 12 and 13 are an exploded view and cross-sectional perspective view of a parallel structure type flow channel formed inside a cartridge header according to the third embodiment of the present invention.

Referring to FIGS. 12 and 13, a detailed configuration in the cartridge header 600 for forming the parallel structure type flow channel applied to the parallel flow channel type filter cartridge according to the third embodiment of the present invention will be described below in detail.

As shown in the drawings, the cartridge header 600 according to the third embodiment of the present invention may include a cartridge enlargement unit 610 and a bypass unit 620.

In the embodiment, the cartridge enlargement unit 610 may include an inner partition wall 611 which includes a semicircular edge and an integrally connected perimeter and has a three-leaf shamrock shape and an outer partition wall 612 which surrounds the inner partition wall 611 at a certain interval on a top surface.

Here, the purified water may be allowed to move through a center of the inner partition wall 611 and the tap water which flows in through the single tap water pipe 602 may be allowed to move between the inner partition wall 611 and the outer partition wall 612.

Also, the cartridge enlargement unit 610 may include the plurality of filter accommodating pipes 603 which each include a purified water inlet pipe 604 through which the purified water flows in from a head 511 of each of the filter bodies 510 and are formed at a bottom surface.

In more detail, the cartridge enlargement unit 610 may include a plurality of purified water outlet portions 613 each formed as a single through hole at a position corresponding to each of the purified water inlet pipes 604 formed in central portions of the plurality of filter accommodating pipes 603, inside the semicircular edge of the inner partition wall 611.

Also, the cartridge enlargement unit 610 may include a plurality of tap water inlet portions 614 disposed around the plurality of purified water outlet portions 613 respectively formed as the single through holes between the inner partition wall 611 and the outer partition wall 612 at certain intervals to have an arc at a certain angle and respectively formed as a plurality of through holes at positions corresponding to tap water outlet holes 623 of the bypass unit 620.

Here, as shown in the drawings, the plurality of tap water inlet portions 614 are provided in semicircular shapes outside the edge for forming the three-leaf shamrock shape of the inner partition wall 611.

Meanwhile, in the embodiment, the bypass unit 620 may include an upper step 621 formed of an upwardly protruding outer perimeter of a top surface at an edge to form a tap water inlet space 622 to which the tap water flowing in through the single tap water pipe 602 moves inside the upper step 621.

Here, a plurality of such tap water outlet holes 623 respectively formed in semicircular shapes corresponding to an outer perimeter of the plurality of filter accommodating pipes 603 to move the tap water to the cartridge enlargement unit 610 may be formed at an edge of the tap water inlet space 622.

Also, in the bypass unit 620, as shown in the drawings, the single purified water pipe 601 through which the purified water flowing in through the cartridge enlargement unit 610 passes may vertically protrude in a central portion of the tap water inlet space 622.

Also, the bypass unit 620 may be formed as a structure in which the end of the single purified water pipe 601 formed in a central portion of the top surface passes through the end of the single tap water pipe 602 formed at an upper cartridge cover 630 which will be described below.

Also, the bypass unit 620 may include a plurality of partition walls 611-1 and 612-1 formed on a bottom surface, corresponding to the inner partition wall 611 and the outer partition wall 612 formed on a top surface of the cartridge enlargement unit 610, and may be formed as a structure in which the bottom surface covers and seals overall a top of the cartridge enlargement unit 610 as shown in the drawings.

Meanwhile, the parallel flow channel type filter cartridge according to the third embodiment of the present invention may include the upper cartridge cover 630 formed having a structure in which the single tap water pipe 602 surrounding the perimeter of the single purified water pipe 601 formed at the bypass unit 620 is formed in a central portion of a top surface, a watertight partition wall 621-1 corresponding to the upper step 621 of the bypass unit 620 is formed on a bottom surface, and an outer perimeter of the bottom surface surrounds and seals the outer partition wall 612 of the cartridge enlargement unit 610, as shown in FIG. 11.

Accordingly, the parallel flow channel type filter cartridge according to the third embodiment of the present invention may allow the tap water to flow into the cartridge header 600 through a gap between an outer surface of the single purified water pipe 601 and an inner surface of the single tap water pipe 602 due to the upper cartridge cover 630.

Also, to describe a water purifying process using the parallel flow channel type filter cartridge according to the third embodiment of the present invention referring to FIGS. 12 and 13, first, when the tap water flows in through the single tap water pipe 602 which forms the upper cartridge cover 630, the tap water may flow into the tap water inlet portion 614 of the cartridge enlargement unit 610 through the tap water inlet space 622 and the tap water outlet holes 623 formed at the bypass unit 620 and the tap water which flows into the tap water inlet portion 614 may be purified while passing through the filter body 510 of the filter portion 500 coupled with the filter accommodating pipe 603.

Next, when the water purified through a head 511 of the filter body 510 is discharged into the purified water outlet portion 613 of the cartridge enlargement unit 610 through the purified water inlet pipe 604 of the filter accommodating pipe 603, the purified water is discharged through the purified water pipe 601 formed in the bypass unit 620 along a moving space formed in the central portion of the top surface of the cartridge enlargement unit 610 by the inner partition wall 611 of the cartridge enlargement unit 610.

That is, to form the water purifying process using the parallel flow channel structure described above, the parallel flow channel type filter cartridge according to the third embodiment, as described above, may include three filter portions 500 with respective circular outer circumferences formed at the bottom surface of the cartridge enlargement unit 610, central portions triangularly connected, and edges adjacent to one other.

Here, a top surface of the cartridge enlargement unit 610 may be formed to have a shape in which perimeters of longitudinal edges formed at tops of the three filter accommodating pipes 603 are connected as arcs and formed as the three-leaf shamrock shape to form a horizontal plane for forming a flow channel. Three purified water outlet portions 613 formed as single through holes respectively may be formed at positions on the top surface corresponding to central portions of the three filter accommodating pipes 603.

Also, the cartridge enlargement unit 610 may provide the moving space of the purified water by forming the inner partition wall 611 which integrally surrounds the three purified water outlet portions 613 on the top surface.

In addition, the cartridge enlargement unit 610 may form the outer partition wall 612 which surrounds the inner partition wall 611 at a certain interval and totally has the three-leaf shamrock shape and may provide a space for temporarily storing the tap water when the tap water which flows into the upper cartridge cover 630 described above flows in through the bypass unit 620.

Here, the cartridge enlargement unit 610 may form three tap water inlet portions 614 which are formed of a plurality of through holes and have semicircular shapes respectively, outside the inner partition wall 611 at which the three purified water outlet portions 613 are formed between the inner partition wall 611 and the outer partition wall 612.

Also, an outer perimeter of the bypass unit 620 may have a totally three-leaf shamrock shape and may be formed in a shape corresponding to the outer partition wall 612 in a structure of surrounding the inner partition wall 611 at the certain interval.

Here, the bypass unit 620 may include the plurality of tap water outlet holes 623 at positions corresponding to the three tap water inlet portions 614 of the cartridge enlargement unit 610, respectively.

Figure 14:
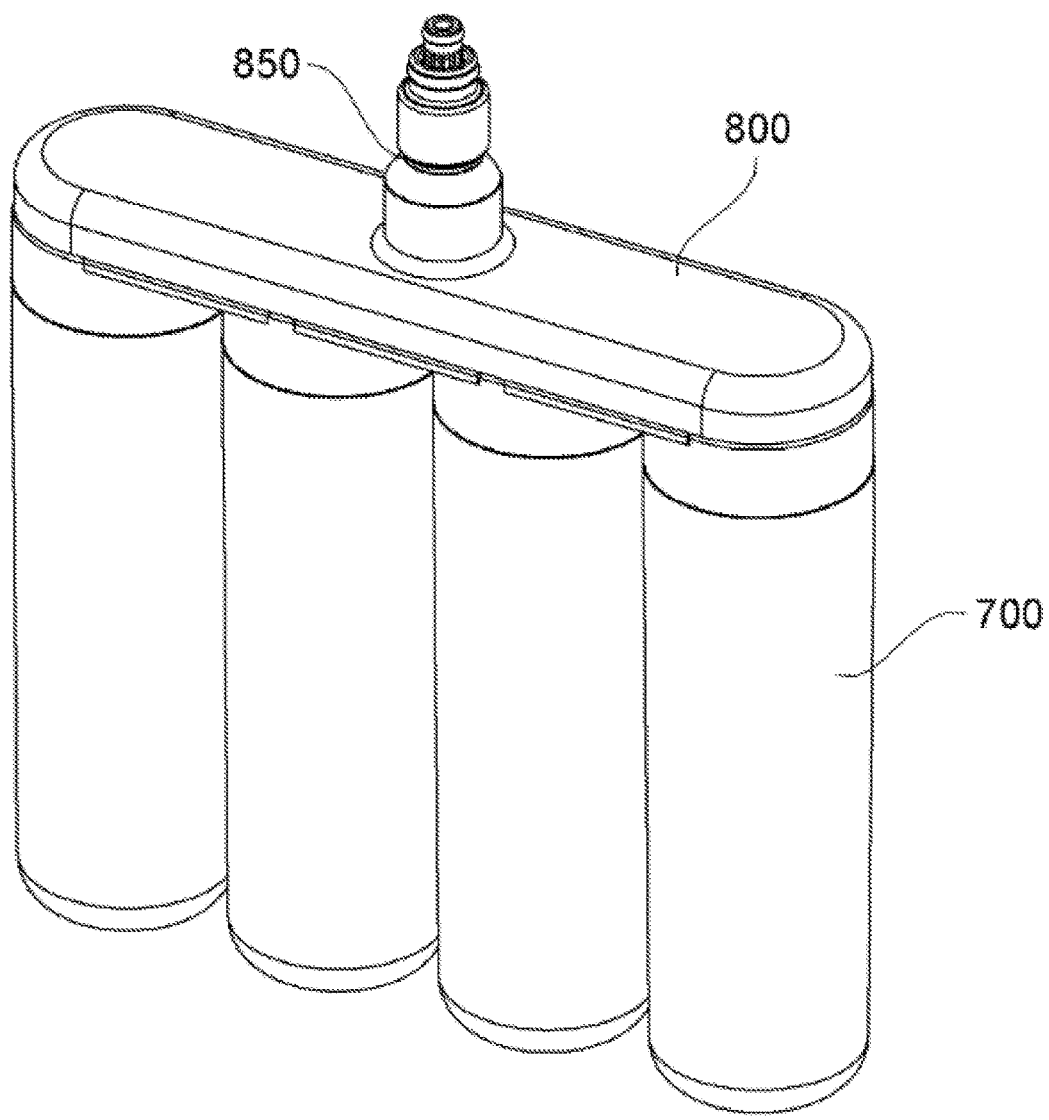
FIGS. 14 and 15 are views of a parallel flow channel type filter cartridge including four linearly combined filter bodies according to a fourth embodiment of the present invention.
Figure 15:
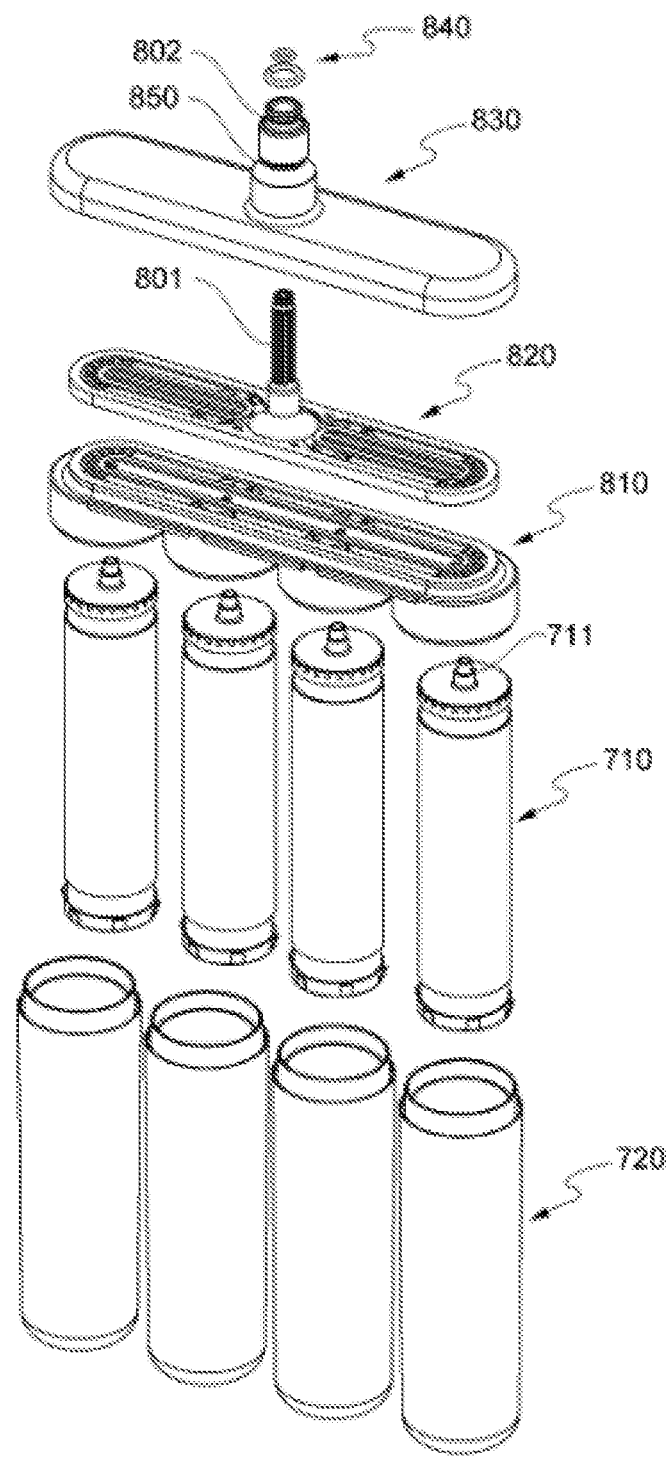

FIGS. 14 and 15 are views of a parallel flow channel type filter cartridge including four linearly combined filter bodies according to a fourth embodiment of the present invention.

As shown in the drawings, the parallel flow channel type filter cartridge according to the fourth embodiment of the present invention may include a filter portion 700 and a cartridge header 800.

In more detail, the filter portion 700 may include a plurality of filter bodies 710 and a plurality of filter housings 720 corresponding to the plurality of filter bodies 710 and independently accommodating the respective filter bodies 710.

Also, in the cartridge header 800, as shown in the drawings, a structure in which a single tap water pipe 802 surrounds a perimeter of a single purified water pipe 801 which vertically protrudes may be formed at a top and a plurality of filter accommodating pipes 803 respectively coupled with top ends of the plurality of filter housings 720 which form the filter portion 700 to seal an inside of the filter portion 700 may be formed at a bottom.

Here, in the cartridge header 800, a parallel structure type flow channel which allows tap water which flows in through the single tap water pipe 802 to flow into the plurality of filter accommodating pipes 803 at the same time and then allows the water purified while passing through the plurality of filter bodies 710 to be discharged through the single purified water pipe 801 may be formed.

Meanwhile, as shown in the drawings, it may be known that the filter cartridge according to the fourth embodiment of the present invention includes annular sealing members 840 formed at a perimeter of an end of the single tap water pipe 802 and a perimeter of an end of the single purified water pipe 801 respectively and a circular fitting groove 850 formed at the perimeter of the single tap water pipe 802 to allow the tap water pipe 802 to be nondirectionally coupled with a head portion of a filter assembly to which the filter cartridge is fastened.

Figure 16:
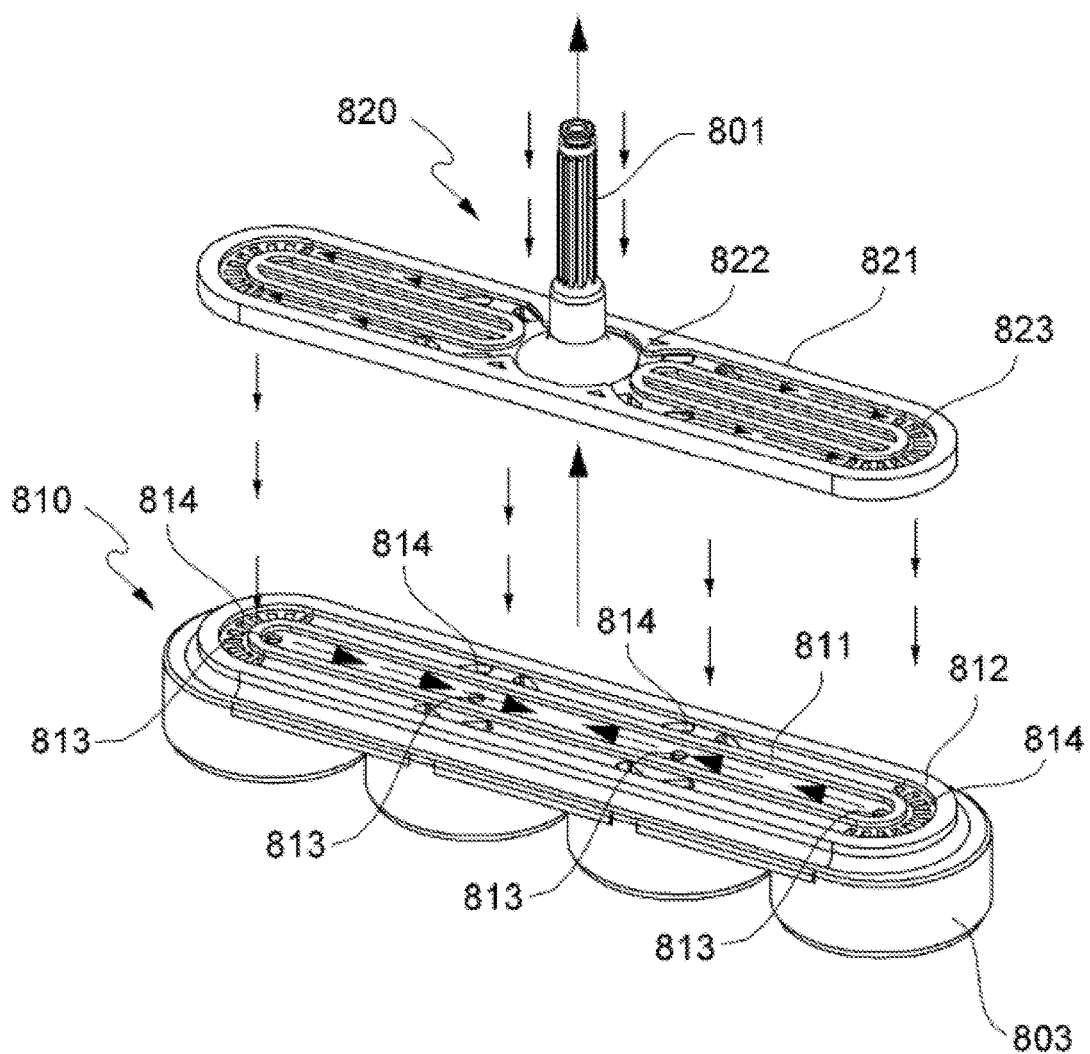
FIGS. 16 and 17 are an exploded view and cross-sectional perspective view of a parallel structure type flow channel formed inside a cartridge header according to the fourth embodiment of the present invention.
Figure 17:
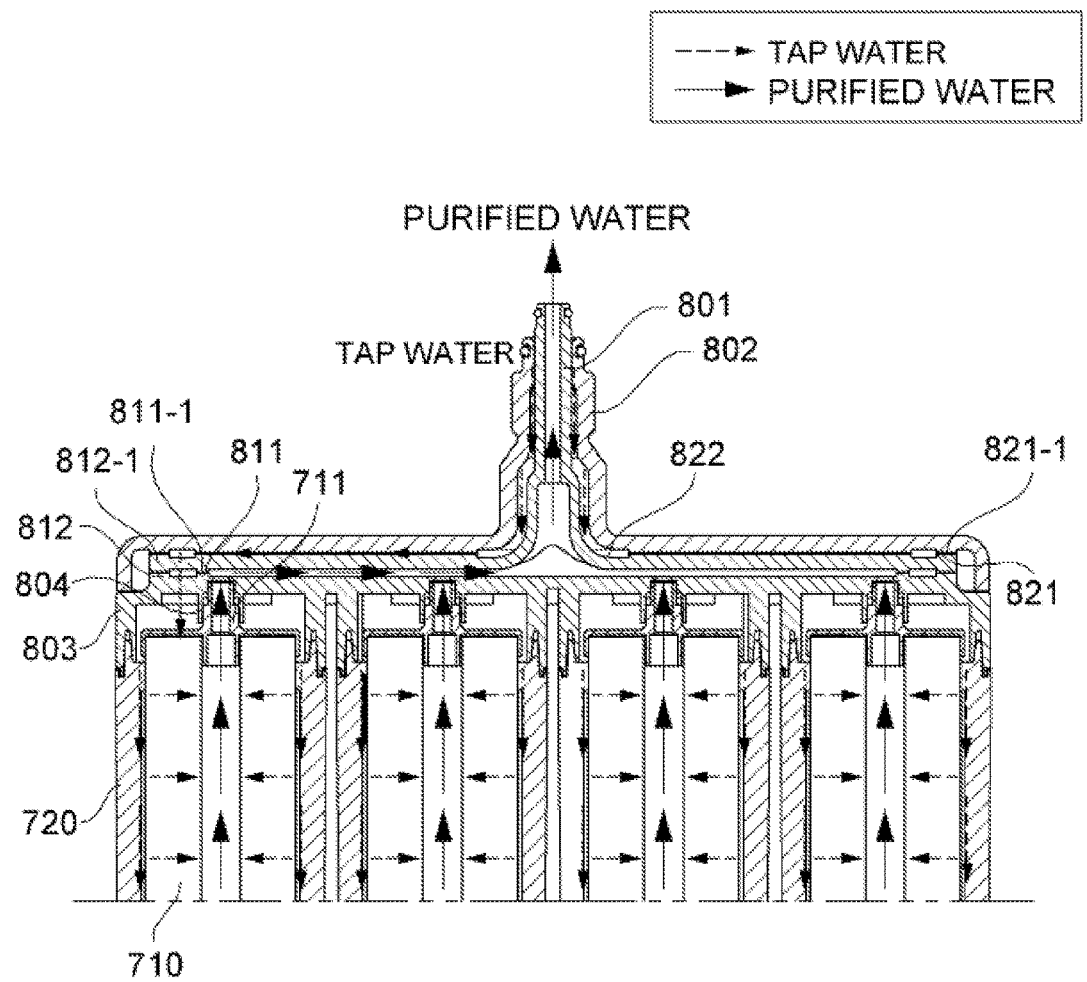

FIGS. 16 and 17 are an exploded view and cross-sectional perspective view of a parallel structure type flow channel formed inside a cartridge header according to the fourth embodiment of the present invention.

Referring to FIGS. 16 and 17, a detailed configuration in the cartridge header 800 for forming the parallel structure type flow channel applied to the parallel flow channel type filter cartridge according to the fourth embodiment of the present invention will be described below in detail.

As shown in the drawings, the cartridge header 800 according to the fourth embodiment of the present invention may include a cartridge enlargement unit 810 and a bypass unit 820.

In the embodiment, the cartridge enlargement unit 810 may include an inner partition wall 811 which includes semicircular edges of both ends and an integrally connected perimeter and an outer partition wall 812 which surrounds the inner partition wall 811 at a certain interval.

Here, the purified water may be allowed to move through a center of the inner partition wall 811 and the tap water which flows in through the single tap water pipe 802 may be allowed to move between the inner partition wall 811 and the outer partition wall 812.

Also, the cartridge enlargement unit 810 may include the plurality of filter accommodating pipes 803 which each include a purified water inlet pipe 804 through which the purified water flows in from a head 711 of each of the filter bodies 710 and are formed at a bottom surface.

In more detail, the cartridge enlargement unit 810 may include a plurality of purified water outlet portions 813 each formed as a single through hole at a position corresponding to each of the purified water inlet pipes 804 formed in a central portion of each of the plurality of filter accommodating pipes 803, inside the edges of the both ends of the inner partition wall 811 at certain intervals.

Also, the cartridge enlargement unit 810 may include a plurality of tap water inlet portions 814 disposed around the plurality of purified water outlet portions 813 respectively formed as the single through holes between the inner partition wall 811 and the outer partition wall 812 at certain intervals to have an arc at a certain angle and respectively formed as a plurality of through holes at positions corresponding to tap water outlet holes 823 of the bypass unit 820.

Here, as shown in the drawings, the plurality of tap water inlet portions 814 are formed in semicircular shapes outside the edges of both ends of the inner partition wall 811, and the tap water inlet portions 814 formed of two pairs of through holes are located at a place corresponding to a perimeter of the purified water pipe 801 and provided at an outer perimeter of the inner partition wall 811 while forming arcs and facing each other.

Meanwhile, in the embodiment, the bypass unit 820 may include an upper step 821 formed of an upwardly protruding outer perimeter of a top surface at an edge to form a tap water inlet space 822 to which the tap water flowing in through the single tap water pipe 802 moves inside the upper step 821.

Here, a plurality of such tap water outlet holes 823 respectively formed in semicircular shapes and arc shapes corresponding to an outer perimeter of the plurality of filter accommodating pipes 803 to move the tap water to the cartridge enlargement unit 810 may be formed at both ends of an edge of the tap water inlet space 822 and a perimeter of the purified water pipe 801.

Also, in the bypass unit 820, as shown in the drawings, the single purified water pipe 801 through which the purified water flowing in through the cartridge enlargement unit 810 passes may vertically protrude in a central portion of the tap water inlet space 822.

Also, the bypass unit 820 may be formed as a structure in which the end of the single purified water pipe 801 formed in a central portion of the top surface passes through the end of the single tap water pipe 802 formed at an upper cartridge cover 830 which will be described below.

Also, the bypass unit 820 may include a plurality of partition walls 811-1 and 812-1 formed on a bottom surface, corresponding to the inner partition wall 811 and the outer partition wall 812 formed on a top surface of the cartridge enlargement unit 810 and may be formed as a structure in which the bottom surface covers and seals overall a top of the cartridge enlargement unit 810 as shown in the drawings.

Meanwhile, the parallel flow channel type filter cartridge according to the fourth embodiment of the present invention may include the upper cartridge cover 830 formed having a structure in which the single tap water pipe 802 surrounding the perimeter of the single purified water pipe 801 formed at the bypass unit 820 is formed in a central portion of a top surface, a watertight partition wall 821-1 corresponding to the upper step 821 of the bypass unit 820 is formed on a bottom surface, and an outer perimeter of the bottom surface surrounds and seals the outer partition wall 812 of the cartridge enlargement unit 810, as shown in FIG. 15.

Accordingly, the parallel flow channel type filter cartridge according to the fourth embodiment of the present invention may allow the tap water to flow into the cartridge header 800 through a gap between an outer surface of the single purified water pipe 801 and an inner surface of the single tap water pipe 802 due to the upper cartridge cover 830.

Also, to describe a water purifying process using the parallel flow channel type filter cartridge according to the fourth embodiment of the present invention referring to FIGS. 16 and 17, first, when the tap water flows in through the single tap water pipe 802 which forms the upper cartridge cover 830, the tap water may flow into the tap water inlet portion 814 of the cartridge enlargement unit 810 through the tap water inlet space 822 and the tap water outlet holes 823 formed at the bypass unit 820 and the tap water which flows into the tap water inlet portion 814 may be purified while passing through the filter body 710 of the filter portion 700 coupled with the filter accommodating pipe 803.

Next, when the water purified through a head 711 of the filter body 710 is discharged into the purified water outlet portion 813 of the cartridge enlargement unit 810 through the purified water inlet pipe 804 of the filter accommodating pipe 803, the purified water is discharged through the purified water pipe 801 formed in the bypass unit 820 along a moving space formed in the central portion of the top surface of the cartridge enlargement unit 810 by the inner partition wall 811 of the cartridge enlargement unit 810.

That is, to form the water purifying process using the parallel flow channel structure described above, the parallel flow channel type filter cartridge according to the fourth embodiment, as described above, may include four filter portions 700 by sequentially forming and adjacently disposing four filter accommodating pipes 803 with circular outer circumferences and central portions linearly connected at the bottom surface of the cartridge enlargement unit 810.

Here, a top surface of the cartridge enlargement unit 810 is formed to have a shape in which perimeters of longitudinal edges formed at tops of the four filter accommodating pipes 803 may be linearly connected to form a horizontal plane for forming a flow channel. Four purified water outlet portions 813 formed as single through holes respectively may be formed at positions on the top surface corresponding to central portions of the four filter accommodating pipes 803.

Also, the cartridge enlargement unit 810 may provide the moving space of the purified water by forming the inner partition wall 811 which integrally surrounds the four purified water outlet portions 813 and totally has a caterpillar structure when viewed from above, on the top surface.

In addition, the cartridge enlargement unit 810 may form the outer partition wall 812 in a structure which has a caterpillar structure corresponding to the inner partition wall 811 and surrounds the inner partition wall 811 at a certain interval and may provide a space for temporarily storing the tap water when the tap water which flows into the upper cartridge cover 830 described above flows in through the bypass unit 820.

Here, the cartridge enlargement unit 810 may form four tap water inlet portions 814 which are formed of a plurality of through holes and have semicircular shapes and arc shapes respectively, outside the inner partition wall 811 at which the four purified water outlet portions 813 are disposed between the inner partition wall 811 and the outer partition wall 812.

Also, the bypass unit 820 may have an outer perimeter in a totally caterpillar structure and may be formed in a shape corresponding to the outer partition wall 812 in a structure of surrounding the inner partition wall 811 at the certain interval.

Here, the bypass unit 820 may include the plurality of tap water outlet holes 823 at positions corresponding to the four tap water inlet portions 814 of the cartridge enlargement unit 810, respectively.

Figure 18:
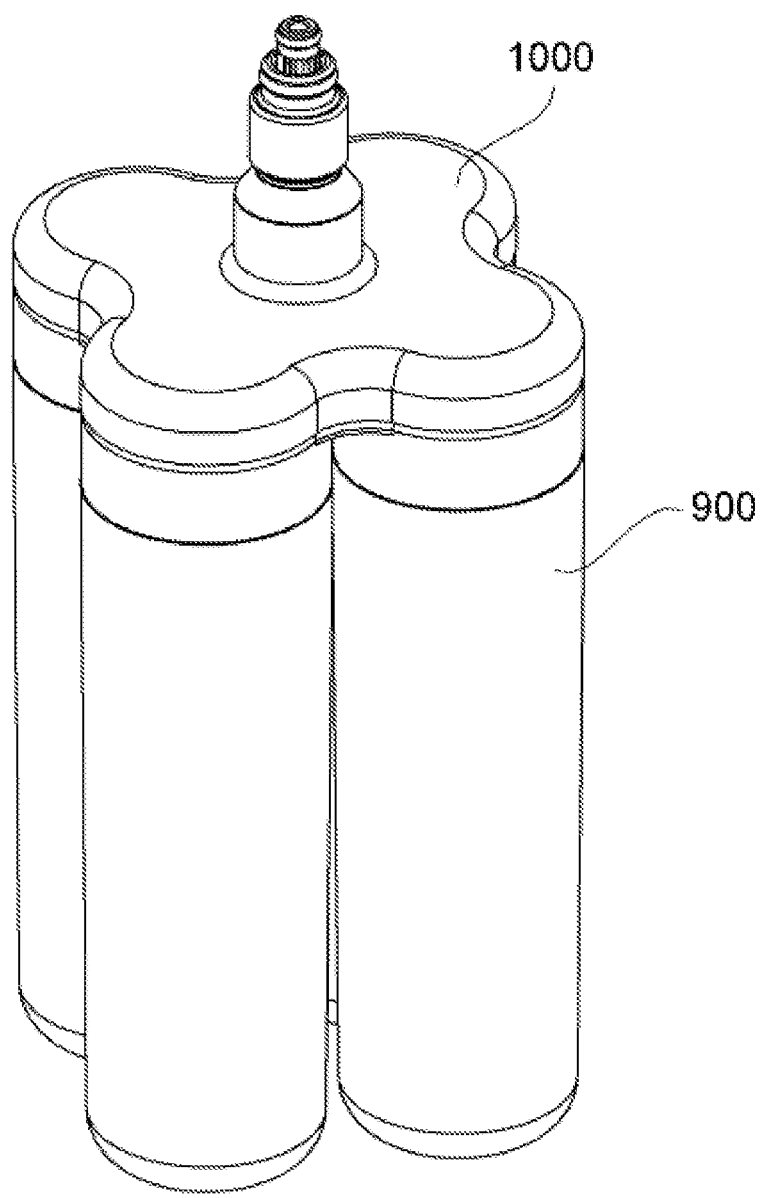
FIGS. 18 and 19 are views of a parallel flow channel type filter cartridge including four rectangularly combined filter bodies according to a fifth embodiment of the present invention.
Figure 19:
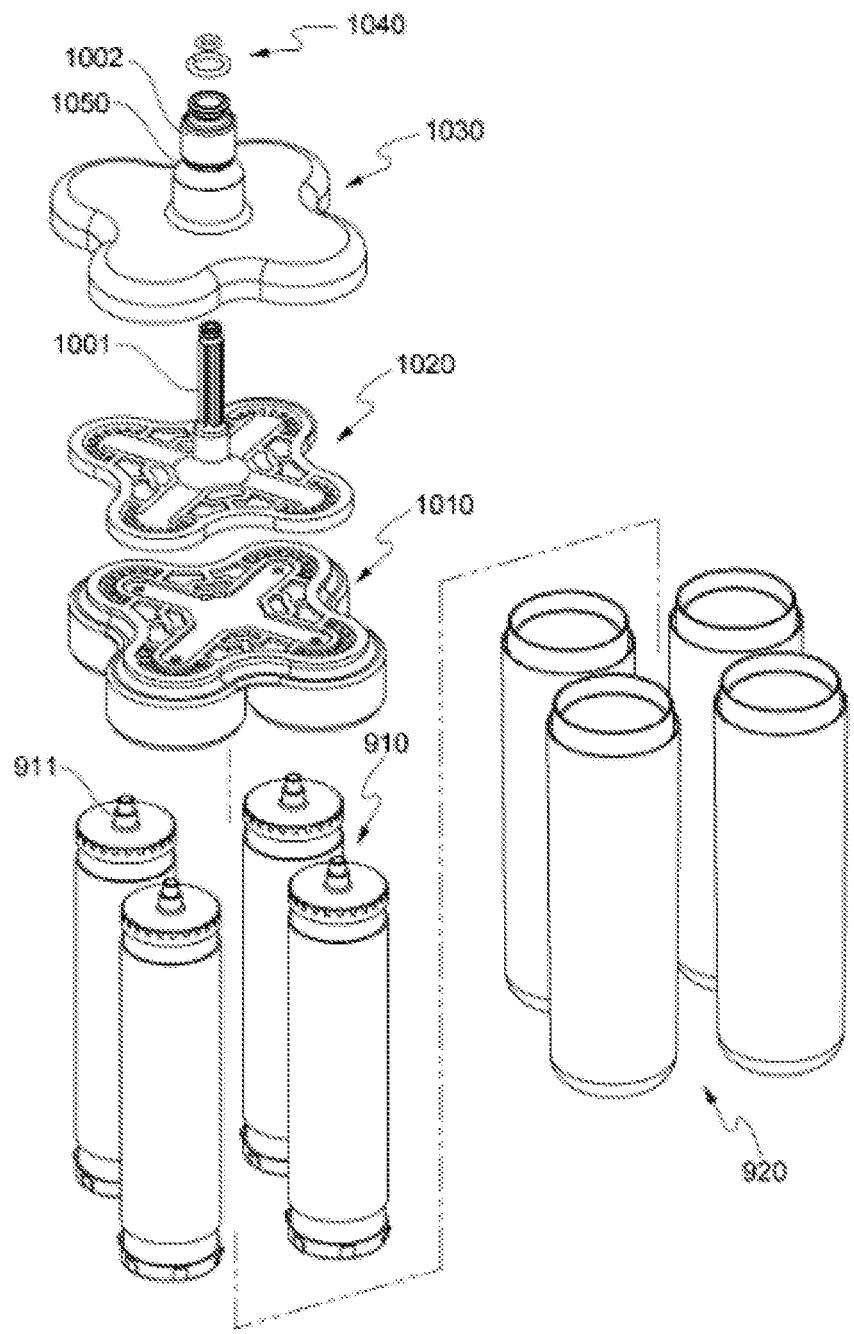

FIGS. 18 and 19 are views of a parallel flow channel type filter cartridge including four rectangularly combined filter bodies according to a fifth embodiment of the present invention.

As shown in the drawings, the parallel flow channel type filter cartridge according to the fifth embodiment of the present invention may include a filter portion 900 and a cartridge header 1000.

In more detail, the filter portion 900 may include a plurality of filter bodies 910 and a plurality of filter housings 920 corresponding to the plurality of filter bodies 910 and independently accommodating the respective filter bodies 910.

Also, in the cartridge header 1000, as shown in the drawings, a structure in which a single tap water pipe 1002 surrounds a perimeter of a single purified water pipe 1001 which vertically protrudes may be formed at a top and a plurality of filter accommodating pipes 1003 respectively coupled with top ends of the plurality of filter housings 920 which form the filter portion 900 to seal an inside of the filter portion 900 may be formed at a bottom.

Here, in the cartridge header 1000, a parallel structure type flow channel which allows tap water which flows in through the single tap water pipe 1002 to flow into the plurality of filter accommodating pipes 1003 at the same time and then allows the water purified while passing through the plurality of filter bodies 910 to be discharged through the single purified water pipe 1001 may be formed.

Meanwhile, as shown in the drawings, it may be known that the filter cartridge according to the fifth embodiment of the present invention includes annular sealing members 1040 formed at a perimeter of an end of the single tap water pipe 1002 and a perimeter of an end of the single purified water pipe 1001 respectively and a circular fitting groove 1050 formed at the perimeter of the single tap water pipe 1002 to allow the tap water pipe 1002 to be nondirectionally coupled with a head portion of a filter assembly to which the filter cartridge is fastened.

Figure 20:
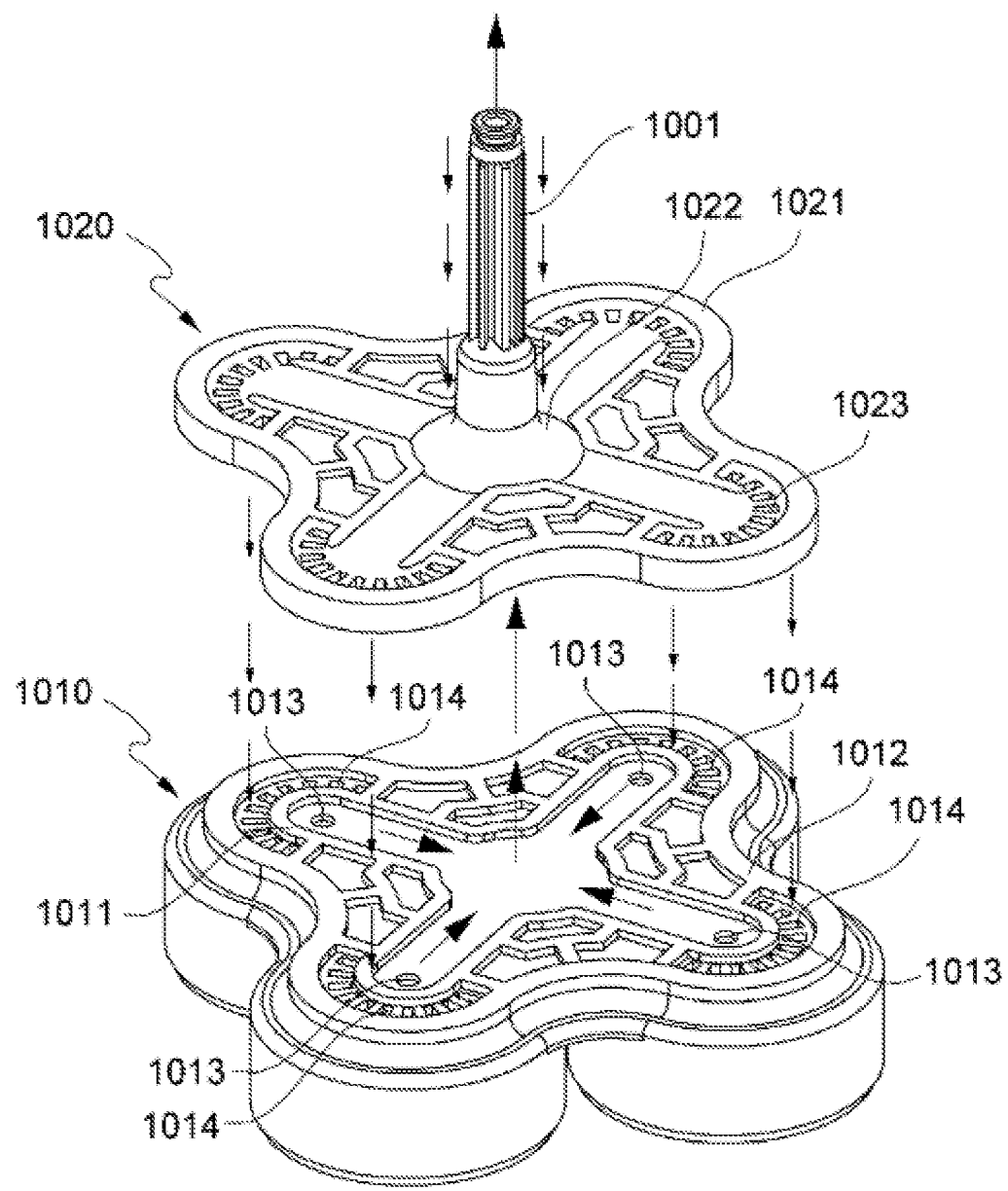
FIGS. 20 and 21 are an exploded view and cross-sectional perspective view of a parallel structure type flow channel formed inside a cartridge header according to the fifth embodiment of the present invention.
Figure 21:
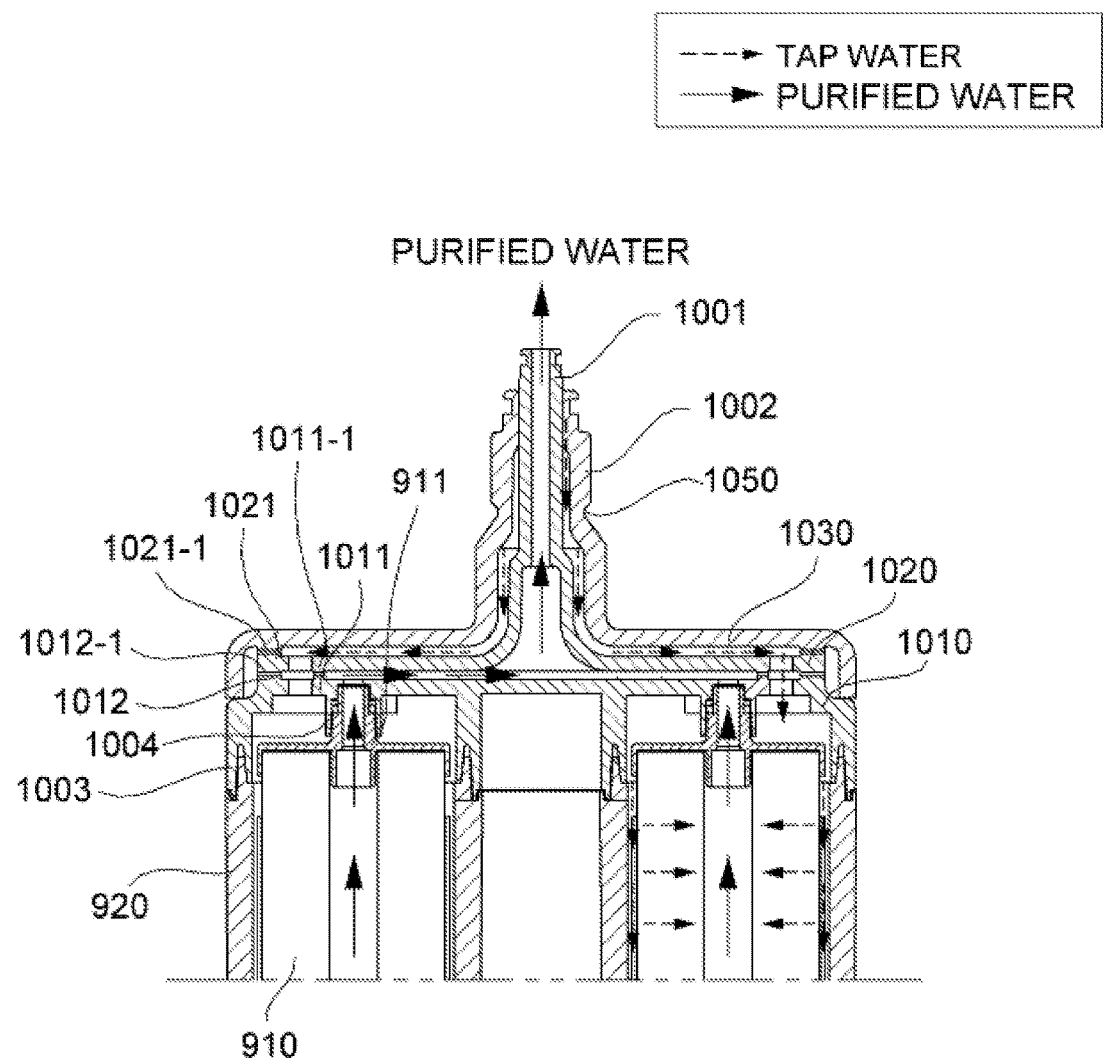

FIGS. 20 and 21 are an exploded view and cross-sectional perspective view of a parallel structure type flow channel formed inside a cartridge header according to the fifth embodiment of the present invention.

Referring to FIGS. 20 and 21, a detailed configuration in the cartridge header 1000 for forming the parallel structure type flow channel applied to the rectangular flow channel type filter cartridge according to the fifth embodiment of the present invention will be described below in detail.

As shown in the drawings, the cartridge header 1000 according to the fifth embodiment of the present invention may include a cartridge enlargement unit 1010 and a bypass unit 1020.

In the embodiment, the cartridge enlargement unit 1010 may include an inner partition wall 1011 which includes a semicircular edge and an integrally connected perimeter and has a four-leaf shamrock shape and an outer partition wall 1012 which surrounds the inner partition wall 1011 at a certain interval on a top surface.

Here, the purified water may be allowed to move through a center of the inner partition wall 1011 and the tap water which flows in through the single tap water pipe 1002 may be allowed to move between the inner partition wall 1011 and the outer partition wall 1012.

Also, the cartridge enlargement unit 1010 may include the plurality of filter accommodating pipes 1003 which each include a purified water inlet pipe 1004 through which the purified water flows in from a head 911 of each of the filter bodies 910 and are formed at a bottom surface.

In more detail, the cartridge enlargement unit 1010 may include a plurality of purified water outlet portions 1013 each formed as a single through hole at a position corresponding to each of the purified water inlet pipes 1004 formed in central portions of the plurality of filter accommodating pipes 1003, inside the edge of the inner partition wall 1011.

Also, the cartridge enlargement unit 1010 may include a plurality of tap water inlet portions 1014 disposed around the plurality of purified water outlet portions 1013 respectively formed as the single through holes between the inner partition wall 1011 and the outer partition wall 1012 at certain intervals to have an arc at a certain angle and respectively formed as a plurality of through holes at positions corresponding to tap water outlet holes 1023 of the bypass unit 1020.

Here, as shown in the drawings, the plurality of tap water inlet portions 1014 are provided in semicircular shapes outside the edge of the inner partition wall 1011.

Meanwhile, in the embodiment, the bypass unit 1020 may include an upper step 1021 formed of an upwardly protruding outer perimeter of a top surface at an edge to form a tap water inlet space 1022 to which the tap water flowing in through the single tap water pipe 1002 moves inside the upper step 1021.

Here, a plurality of such tap water outlet holes 1023 respectively formed in semicircular shapes corresponding to an outer perimeter of the plurality of filter accommodating pipes 1003 to move the tap water to the cartridge enlargement unit 1010 may be formed at an edge of the tap water inlet space 1022.

Also, in the bypass unit 1020, as shown in the drawings, the single purified water pipe 1001 through which the purified water flowing in through the cartridge enlargement unit 1010 passes may vertically protrude in a central portion of the tap water inlet space 1022.

Also, the bypass unit 1020 may be formed as a structure in which the end of the single purified water pipe 1001 formed in a central portion of the top surface passes through the end of the single tap water pipe 1002 formed at an upper cartridge cover 1030 which will be described below.

Also, the bypass unit 1020 may include a plurality of partition walls 1011-1 and 1012-1 formed on a bottom surface, corresponding to the inner partition wall 1011 and the outer partition wall 1012 formed on a top surface of the cartridge enlargement unit 1010 and may be formed as a structure in which the bottom surface covers and seals overall a top of the cartridge enlargement unit 1010 as shown in the drawings.

Meanwhile, the parallel flow channel type filter cartridge according to the fifth embodiment of the present invention may include the upper cartridge cover 1030 formed having a structure in which the single tap water pipe 1002 surrounding the perimeter of the single purified water pipe 1001 formed at the bypass unit 1020 is formed in a central portion of a top surface, a watertight partition wall 1021-1 corresponding to the upper step 1021 of the bypass unit 1020 is formed on a bottom surface, and an outer perimeter of the bottom surface surrounds and seals the outer partition wall 1012 of the cartridge enlargement unit 1010, as shown in FIG. 19.

Accordingly, the parallel flow channel type filter cartridge according to the fifth embodiment of the present invention may allow the tap water to flow into the cartridge header 1000 through a gap between an outer surface of the single purified water pipe 1001 and an inner surface of the single tap water pipe 1002 due to the upper cartridge cover 1030.

Also, to describe a water purifying process using the parallel flow channel type filter cartridge according to the fifth embodiment of the present invention referring to FIGS. 20 and 21, first, when the tap water flows in through the single tap water pipe 1002 which forms the upper cartridge cover 1030, the tap water may flow into the tap water inlet portion 1014 of the cartridge enlargement unit 1010 through the tap water inlet space 1022 and the tap water outlet holes 1023 formed at the bypass unit 1020 and the tap water which flows into the tap water inlet portion 1014 may be purified while passing through the filter body 910 of the filter portion 900 coupled with the filter accommodating pipe 1003.

Next, when the water purified through a head 911 of the filter body 910 is discharged into the purified water outlet portion 1013 of the cartridge enlargement unit 1010 through the purified water inlet pipe 1004 of the filter accommodating pipe 1003, the purified water is discharged through the purified water pipe 1001 formed in the bypass unit 1020 along a moving space formed in the central portion of the top surface of the cartridge enlargement unit 1010 by the inner partition wall 1011 of the cartridge enlargement unit 1010.

That is, to form the water purifying process using the parallel flow channel structure described above, the parallel flow channel type filter cartridge according to the fifth embodiment, as described above, may include four filter portions 900 with respective circular outer circumferences formed at the bottom surface of the cartridge enlargement unit 1010, central portions rectangularly connected, and edges adjacent to one other.

Here, a top surface of the cartridge enlargement unit 1010 may be formed in a shape in which perimeters of longitudinal edges formed at tops of the four filter accommodating pipes 1003 are connected as arcs in a four-leaf shamrock shape to form a horizontal plane for forming a flow channel Four purified water outlet portions 1013 formed as single through holes respectively at positions corresponding to central portions of the four filter accommodating pipes 1003 on the top surface.

Also, the cartridge enlargement unit 1010 may provide the moving space of the purified water by forming the inner partition wall 1011 which integrally surrounds the four purified water outlet portions 1013 and totally has an X shape when viewed from above, on the top surface.

In addition, the cartridge enlargement unit 1010 may form the outer partition wall 1012 which surrounds the inner partition wall 1011 at a certain interval and totally has the four-leaf shamrock shape and may provide a space for temporarily storing the tap water when the tap water which flows into the upper cartridge cover 1030 described above flows in through the bypass unit 1020.

Here, the cartridge enlargement unit 1010 may form four tap water inlet portions 1014 which are formed of a plurality of through holes and have semicircular shapes respectively, outside the inner partition wall 1011 at which the four purified water outlet portions 1013 are formed between the inner partition wall 1011 and the outer partition wall 1012.

Also, an outer perimeter of the bypass unit 1020 may have a totally four-leaf shamrock shape and may be formed in a shape corresponding to the outer partition wall 1012 in a structure of surrounding the inner partition wall 1011 at the certain interval.

Here, the bypass unit 1020 may include the plurality of tap water outlet holes 1023 at positions corresponding to the four tap water inlet portions 1014 of the cartridge enlargement unit 1010, respectively.

As described above, according to one embodiment of the present invention, a cartridge header which includes a parallel type flow channel capable of using a plurality of filter bodies at the same time is provided to increase filterability and to easily maintain and repair a filter.

Also, since a plurality of filter bodies may be coupled with a cartridge header which includes a single tap water inlet and a single purified water outlet, additional components for coupling a plurality of filter cartridge with a filter head are unnecessary, thereby reducing manufacturing costs and preventing a wasteful use of resources.

Also, a cartridge header with a built-in parallel type flow channel capable of purifying a large amount of water using many filter bodies at the same time is used, thereby greatly increasing a water purifying amount to be processed at once.

Also, when a parallel flow channel in a cartridge header, since the flow channel is formed on a top surface of a cartridge enlargement unit using an inner partition wall and an outer partition wall, a complicated configuration is unnecessary, thereby easily manufacturing and reducing manufacturing costs to increase productivity.

Also, a fitting groove is formed on a perimeter of a single tap water pipe to allow the tap water pipe to be nondirectionally coupled with a head portion of a filter assembly to which a filter cartridge is fastened, thereby providing excellent compatibility to be applied to various filter assemblies.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, in the embodiments, it has been described that a cartridge header has a structure in which a tap water pipe surrounds a purified water pipe. However, the tap water pipe and the purified water pipe are exchanged in such a way that the purified water pipe may surround the tap water pipe. In this case, moving paths of tap water and purified water will be reversed. Therefore the embodiments described above should be descriptively considered not in a limitative viewpoint. The scope of the present invention is shown in the following claims not in the described above, and all differences within the range of equivalents thereof should be understood as being included in the present invention.

What is claimed is:

1. A parallel flow channel type filter cartridge comprising:
a filter portion which comprises a plurality of filter bodies and a plurality of filter housings corresponding to the plurality of filter bodies and independently accommodating the respective filter bodies; and
a cartridge header comprising:
a tap water pipe surrounds a perimeter of a purified water pipe which vertically protrudes from the cartridge header,
a plurality of filter accommodating pipes coupled with top ends of the plurality of filter housings which form the filter portion to seal an inside of the filter portion at a bottom of the cartridge header, and
a parallel structure type flow channel which allows tap water which flows in through the tap water pipe to flow into the plurality of filter accommodating pipes at the same time and then allows the water purified while passing through the plurality of filter bodies to be discharged through the purified water pipe,
wherein the cartridge header comprises:
a cartridge enlargement unit in which the plurality of filter accommodating pipes which each comprise a purified water inlet pipe into which purified water flows from a head of each of the filter bodies are formed on a bottom surface of the cartridge enlargement unit and the purified water and the tap water which flows in through the tap water pipe are allowed to move respectively on a top surface of the cartridge enlargement unit,
wherein the cartridge enlargement unit comprises an inner partition wall with an integrally connected perimeter and an outer partition wall which surrounds the inner partition wall at a certain interval are formed on a top surface of the cartridge enlargement unit to allow the purified water to move in a center of the inner partition wall and to allow the tap water which flows in through the tap water pipe to move between the inner partition wall and the outer partition wall;
a bypass unit comprising a tap water inlet space configured to move the tap water from the tap water pipe to the cartridge enlargement unit and the purified water pipe vertically protrudes through the cartridge enlargement unit,
wherein the bypass unit comprises an upper step formed of an upwardly protruding outer perimeter of a top surface of the bypass unit provided at an edge to form the tap water inlet space inside the upper step, a tap water outlet hole at each of edges of the tap water inlet space corresponding to the outer perimeter of the plurality of filter accommodating pipe configured to move the tap water to the cartridge enlargement unit, and the purified water pipe vertically protrudes through the bypass unit; and
an upper cartridge cover comprising the tap water pipe which surrounds the perimeter and top surface of the purified water pipe of the bypass unit,
wherein the upper cartridge cover comprises a watertight partition wall configured to allow the tap water to flow in through a gap between an outer surface of the purified water pipe and an inner surface of the tap water pipe and an outer perimeter surrounds and seals the outer partition wall of the cartridge enlargement unit.

2. The parallel flow channel type filter cartridge of claim 1, wherein the cartridge enlargement unit comprises:
a plurality of purified water outlet portions formed as single through holes respectively at positions corresponding to the respective purified water inlet pipes formed in central portions of the plurality of filter accommodating pipes inside two or more semicircular edges of the inner partition wall; and
a plurality of tap water inlet portions disposed around the plurality of purified water outlet portions formed as the single through holes respectively between the inner partition wall and the outer partition wall at certain intervals to have arcs at certain angles and formed as a plurality of through holes respectively at positions corresponding to the tap water outlet holes of the bypass unit.

3. The parallel flow channel type filter cartridge of claim 2, wherein the bypass unit comprising a structure in which an end of the purified water pipe formed in a central portion of a top surface of the bypass unit passes through an end of the tap water pipe formed in the upper cartridge cover, the structure comprises a plurality of partition walls corresponding to the inner partition wall and the outer partition wall formed on the top surface of the cartridge enlargement unit, and a bottom surface which covers and seals overall a top of the cartridge enlargement unit.

4. The parallel flow channel type filter cartridge of claim 3, wherein annular sealing members are formed at a perimeter of the end of the tap water pipe formed in the upper cartridge cover and a perimeter of the end of the purified water pipe formed in the bypass unit, respectively, and
wherein a fitting groove is formed at a perimeter of the tap water pipe to allow the tap water pipe to be nondirectionally coupled with a head portion of a filter assembly to which the filter cartridge is fastened.

5. The parallel flow channel type filter cartridge of claim 1, wherein the cartridge enlargement unit comprises:
two filter accommodating pipes which are adjacently disposed and have circular outer circumferences and linearly connected central portions are formed on the bottom surface of the cartridge enlargement unit,
a top surface having a shape in which perimeters of longitudinal edges formed at tops of the two filter accommodating pipes are linearly connected,
two purified water outlet portions formed as single through holes respectively are formed at positions on the top surface of the cartridge enlargement unit corresponding to central portions of the two filter accommodating pipes,
the inner partition wall which integrally surrounds the two purified water outlet portions and has an oblong structure overall when viewed from above is formed on the top surface,
the outer partition wall has an oblong shape corresponding to the inner partition wall and surrounds the inner partition wall at a certain interval, and
two tap water inlet portions formed as a plurality of through holes in semicircular shapes are formed outside the two purified water outlet portions between the inner partition wall and the outer partition wall, and
wherein the bypass unit has an oblong structure overall and a shape corresponding to the outer partition wall which surrounds the inner partition wall at the certain interval and comprises a plurality of tap water outlet holes at positions corresponding to the two tap water inlet portions of the cartridge enlargement unit, respectively.

6. The parallel flow channel type filter cartridge of claim 1, wherein the cartridge enlargement unit comprises:
three filter accommodating pipes which are adjacently disposed and have circular outer circumferences and linearly connected central portions are formed on the bottom surface of the cartridge enlargement unit, a top surface having a shape in which perimeters of longitudinal edges formed at tops of the three filter accommodating pipes are linearly connected, three purified water outlet portions formed as single through holes respectively are formed at positions on the top surface of the cartridge enlargement unit corresponding to central portions of the three filter accommodating pipes, the inner partition wall which integrally surrounds the three purified water outlet portions and has an oblong structure overall when viewed from above is formed on the top surface of the cartridge enlargement unit, the outer partition wall has an oblong shape corresponding to the inner partition wall and surrounds the inner partition wall at a certain interval, and three tap water inlet portions formed as a plurality of through holes in arc shapes are formed outside the three purified water outlet portions between the inner partition wall and the outer partition wall, and wherein the bypass unit has an oblong structure overall and a shape corresponding to the outer partition wall which surrounds the inner partition wall at the certain interval and comprises a plurality of tap water outlet holes at positions corresponding to the three tap water inlet portions of the cartridge enlargement unit, respectively.

7. The parallel flow channel type filter cartridge of claim 1, wherein the cartridge enlargement unit comprises:

three filter accommodating pipes which are disposed to allow edges to be adjacent to one another and have circular outer circumferences and triangularly connected central portions are formed on the bottom surface of the cartridge enlargement unit, a top surface having a shape in which perimeters of longitudinal edges formed at tops of the three filter accommodating pipes are connected as arcs in a three-leaf shamrock shape, three purified water outlet portions formed as single through holes respectively are formed at positions on the top surface of the cartridge enlargement unit corresponding to central portions of the three filter accommodating pipes, the inner partition wall which integrally surrounds the three purified water outlet portions is formed on the top surface of the cartridge enlargement unit, the outer partition wall surrounds the inner partition wall at a certain interval and has a three-leaf shamrock shape overall, and three tap water inlet portions formed as a plurality of through holes in semicircular shapes are formed outside the three purified water outlet portions between the inner partition wall and the outer partition wall, and wherein the bypass unit has a three-leaf shamrock shape overall and a shape corresponding to the outer partition wall which surrounds the inner partition wall at the certain interval and comprises a plurality of tap water outlet holes at positions corresponding to the three tap water inlet portions of the cartridge enlargement unit, respectively.

8. The parallel flow channel type filter cartridge of claim 1, wherein the cartridge enlargement unit comprises:

four filter accommodating pipes which are sequentially disposed to be adjacent to one another and have circular outer circumferences and linearly connected central portions are formed on the bottom surface of the cartridge enlargement unit, a top surface having a shape in which perimeters of longitudinal edges formed at tops of the four filter accommodating pipes are linearly connected, four purified water outlet portions formed as single through holes respectively are formed at positions on the top surface of the cartridge enlargement unit corresponding to central portions of the four filter accommodating pipes, the inner partition wall which integrally surrounds the four purified water outlet portions and has a caterpillar structure overall when viewed from above is formed on the top surface of the cartridge enlargement unit, the outer partition wall has an oblong structure in a shape corresponding to the inner partition wall and surrounds the inner partition wall at a certain interval, and four tap water inlet portions formed as a plurality of through holes in arc shapes are formed outside the four purified water outlet portions between the inner partition wall and the outer partition wall, and wherein the bypass unit has an oblong structure overall and a shape corresponding to the outer partition wall which surrounds the inner partition wall at the certain interval and comprises a plurality of tap water outlet holes at positions corresponding to the four tap water inlet portions of the cartridge enlargement unit, respectively.

9. The parallel flow channel type filter cartridge of claim 1, wherein the cartridge enlargement unit comprises:

four filter accommodating pipes which are sequentially disposed to be adjacent to one another and have circular outer circumferences and rectangularly connected central portions are formed on the bottom surface of the cartridge enlargement unit, the top surface of the cartridge enlargement unit has a shape in which perimeters of longitudinal edges formed at tops of the four filter accommodating pipes are connected as arcs in a four-leaf shamrock shape, four purified water outlet portions formed as single through holes respectively are formed at positions on the top surface of the cartridge enlargement unit corresponding to central portions of the four filter accommodating pipes, the inner partition wall which integrally surrounds the four purified water outlet portions and defines an X-shaped space when viewed from above is formed on the top surface of the cartridge enlargement unit, the outer partition wall surrounds the inner partition wall at a certain interval and has a four-leaf shamrock shape overall, and four tap water inlet portions formed as a plurality of through holes in arc shapes are formed outside the four purified water outlet portions between the inner partition wall and the outer partition wall, and wherein the bypass unit has a four-leaf shamrock shaped perimeter overall and a shape corresponding to the outer partition wall which surrounds the inner partition wall at the certain interval and comprises a plurality of tap water outlet holes at positions corresponding to the four tap water inlet portions of the cartridge enlargement unit, respectively.

* * * * *